(12) United States Patent  
Tsai et al.

(10) Patent No.: US 12,382,463 B2  
(45) Date of Patent: Aug. 5, 2025

(54) METHOD AND USER EQUIPMENT FOR CONFIGURED GRANT CONFIGURATION

(71) Applicant: SHARP KABUSHIKI KAISHA, Sakai (JP)

(72) Inventors: Hsin-Hsi Tsai, Taipei (TW); Hung-Chen Chen, Taipei (TW); Mei-Ju Shih, Taipei (TW); Heng-Li Chin, Taipei (TW); Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/204,249

(22) Filed: Mar. 17, 2021

(65) Prior Publication Data

US 2021/0307055 A1 Sep. 30, 2021

Related U.S. Application Data

(60) Provisional application No. 62/994,146, filed on Mar. 24, 2020.

(51) Int. Cl.  
*H04W 72/23* (2023.01)  
*H04B 17/318* (2015.01)  
(Continued)

(52) U.S. Cl.  
CPC .......... *H04W 72/23* (2023.01); *H04B 17/318* (2015.01); *H04W 24/10* (2013.01); (Continued)

(58) Field of Classification Search  
None  
See application file for complete search history.

(56) References Cited

U.S. PATENT DOCUMENTS 10,667,323 B1 * 5/2020 Shih .................. H04W 76/27  
2010/0113058 A1 * 5/2010 Wu .................... H04W 72/02  
455/452.1  
(Continued)

FOREIGN PATENT DOCUMENTS

CN 110771082 A 2/2020  
EP 3478019 A1 * 5/2019 ............... H04L 5/00  
(Continued)

OTHER PUBLICATIONS

3GPP 38.331 ver. 15.4.0 Release 15, "5G; NR; Radio Resource Control (RRC); Protocol Specification" (Year: 2019).*

(Continued)

*Primary Examiner* — Jamaal Henson  
(74) *Attorney, Agent, or Firm* — ScienBiziP, P.C.

(57) ABSTRACT

A method, performed by a User Equipment (UE) for a Configured Grant (CG) configuration, includes receiving a Radio Resource Control (RRC) release message from a cell of a Network (NW) while the UE is in an RRC_CONNECTED state, the RRC release message including the CG configuration; entering an RRC_INACTIVE state from the RRC_CONNECTED state in response to receiving the RRC release message; receiving an RRC message from the cell while the UE is in the RRC_INACTIVE state; and determining whether to release the CG configuration based on the RRC message.

14 Claims, 3 Drawing Sheets

(51) Int. Cl.
  *H04W 24/10* (2009.01)
  *H04W 76/27* (2018.01)
  *H04W 76/30* (2018.01)
  *H04W 80/02* (2009.01)
(52) U.S. Cl.
  CPC ........... *H04W 76/27* (2018.02); *H04W 76/30* (2018.02); *H04W 80/02* (2013.01)

(56) References Cited

U.S. PATENT DOCUMENTS

| | | | | |
|---|---|---|---|---|
| 2010/0254351 | A1* | 10/2010 | Wang | H04J 11/0069 370/332 |
| 2011/0134774 | A1* | 6/2011 | Pelletier | H04W 72/042 370/242 |
| 2017/0367116 | A1* | 12/2017 | Li | H04W 72/51 |
| 2018/0042057 | A1* | 2/2018 | Johansson | H04W 76/10 |
| 2018/0139778 | A1* | 5/2018 | Chou | H04W 76/27 |
| 2018/0176834 | A1* | 6/2018 | Wei | H04W 36/0066 |
| 2018/0220486 | A1* | 8/2018 | Tseng | H04W 36/305 |
| 2018/0279152 | A1* | 9/2018 | Kim | H04W 24/10 |
| 2018/0302914 | A1* | 10/2018 | da Silva | H04W 74/08 |
| 2018/0376457 | A1 | 12/2018 | Tseng et al. | |
| 2019/0052435 | A1* | 2/2019 | Martin | H04W 76/27 |
| 2020/0037210 | A1* | 1/2020 | Rugeland | H04W 76/27 |
| 2020/0100321 | A1* | 3/2020 | Sengupta | H04W 76/36 |
| 2020/0107268 | A1* | 4/2020 | Lee | H04W 52/0229 |
| 2020/0107396 | A1* | 4/2020 | Wang | H04W 72/14 |
| 2020/0137761 | A1* | 4/2020 | Shih | H04W 72/0493 |
| 2020/0170069 | A1* | 5/2020 | Shih | H04W 76/19 |
| 2020/0196264 | A1* | 6/2020 | Shih | H04W 76/30 |
| 2020/0314805 | A1 | 10/2020 | Tseng et al. | |
| 2021/0211947 | A1* | 7/2021 | Agiwal | H04W 36/0055 |
| 2021/0211994 | A1* | 7/2021 | Shih | H04W 76/19 |
| 2021/0227575 | A1* | 7/2021 | Ou | H04W 72/115 |
| 2021/0258954 | A1* | 8/2021 | Wang | H04W 72/23 |
| 2021/0259040 | A1* | 8/2021 | Babaei | H04W 72/23 |
| 2021/0298085 | A1* | 9/2021 | Lee | H04W 74/02 |
| 2021/0321413 | A1* | 10/2021 | Shin | H04W 72/23 |
| 2021/0345395 | A1* | 11/2021 | Chatterjee | H04W 4/70 |
| 2021/0360705 | A1* | 11/2021 | Oh | H04W 76/30 |
| 2021/0360738 | A1* | 11/2021 | Shan | H04W 68/005 |
| 2021/0410166 | A1* | 12/2021 | Shrestha | H04L 5/0055 |
| 2022/0030489 | A1* | 1/2022 | Sharma | H04W 36/08 |
| 2022/0167371 | A1* | 5/2022 | Thangarasa | H04W 76/28 |

FOREIGN PATENT DOCUMENTS

| | | | | |
|---|---|---|---|---|
| EP | 3860290 | A1 * | 8/2021 | ......... H04W 72/042 |
| JP | 2020027955 | A | 2/2020 | |
| WO | 2019217829 | A1 | 11/2019 | |
| WO | 2020033895 | A1 | 2/2020 | |
| WO | WO-2020259960 | A1 * | 12/2020 | ......... H04L 5/0053 |

OTHER PUBLICATIONS

3GPP TS 38.304 V15.4.0 (Apr. 2019), "5G; NR; Radio Resource Control (RRC); Protocol Specification" see p. 66 Section—5.3.13.3 which discuss action related to transmission of RRCResumeRequest or RRCResumeRequest1. (Year: 2019).*
Qualcomm "E-mail Discussion Report on [106#61] D-PUR Request, (re)configuration and release mechanism", dated Aug. 2019, R2-1909841. (Year: 2019).*
3GPP, "5G; NR; Physical Layer Measurements", ETSI TS 138.215 Version 15.2.0 dated Jul. 2018 (Year: 2018).*
Samsung, "Data transfer in inactive state based on 4-step RACH procedures", R2-1701529, 3GPP TSG-RAN WG2 #97, Athens, Greece, Feb. 13-17, 2017.
Ericsson, "Small data transmission for inactive UEs", R2-166922, 3GPP TSG-RAN WG2 #95bis, Kaohsiung, Taiwan, Oct. 10-14, 2016.
3GPP TS 38.212, "3rd Generation Partnership Project; Technical Specification Group Radio Access Network; NR; Multiplexing and channel coding (Release 15)", V15.7.0 (Sep. 2019).
3GPP TS 38.213, "3rd Generation Partnership Project; Technical Specification Group Radio Access Network; NR; Physical layer procedures for control (Release 15)", V15.7.0 (Sep. 2019).
3GPP TS 38.214, "3rd Generation Partnership Project; Technical Specification Group Radio Access Network; NR; Physical layer procedures for data (Release 15)", V15.7.0 (Sep. 2019).
3GPP TS 38.300, "3rd Generation Partnership Project; Technical Specification Group Radio Access Network; NR; NR and NG-RAN Overall Description; Stage 2 (Release 15)", V15.7.0 (Sep. 2019).
3GPP TS 38.304, "3rd Generation Partnership Project; Technical Specification Group Radio Access Network; NR; User Equipment (UE) procedures in Idle mode and RRC Inactive state (Release 15)", V15.6.0 (Dec. 2019).
3GPP TS 38.321, "3rd Generation Partnership Project; Technical Specification Group Radio Access Network; NR; Medium Access Control (MAC) protocol specification (Release 15)", V15.7.0 (Sep. 2019).
3GPP TS 38.331, "3rd Generation Partnership Project; Technical Specification Group Radio Access Network; NR; Radio Resource Control (RRC) protocol specification (Release 15)", V15.7.0 (Sep. 2019).
Huawei et al: "Key points on NR small data", 3GPP Draft; RP-192789, 3GPP TSG RAN Meeting #86, Stiges, Spain, Dec. 9-12, 2019 (Dec. 2, 2019).
ZTE Corporation (Email Discussion Moderator) : "Summary of small data enhancements for NR Rel-17—Phase 2", 3GPP Draft; RP-192574, 3GPP TSG-RAN Meeting #86, Sitges, Spain, Dec. 8-12, 2019 (Dec. 2, 2019).
ZTE Corporation, "Work Item on NR smalldata transmissions in Inactive state", 3GPP TSG RAN #86 RP-193252, Dec. 12, 2019.
Ericsson, "Remaining issues for SPS in NR", 3GPP TSG RAN WG2 #100 R2-1712937, Nov. 17, 2017.
ZTE Corporation, Sanechips, "Remaining issues for D-PUR in Idle", 3GPP TSG RAN WG2 #107bis R2-1912896, Oct. 4, 2019.

* cited by examiner

METHOD AND USER EQUIPMENT FOR CONFIGURED GRANT CONFIGURATION

CROSS-REFERENCE TO RELATED APPLICATION(S)

The present disclosure claims the benefit of and priority to provisional U.S. patent application Ser. No. 62/994,146 ("the '146 provisional"), filed on Mar. 24, 2020, entitled "Method and Apparatus for Configured Grant Configuration in RRC INACTIVE State". The contents of the '146 provisional are fully incorporated herein by reference for all purposes.

FIELD

The present disclosure is generally related to wireless communications, and specifically, to a method and a user equipment for Configured Grant (CG) configuration.

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need in the art to improve Configured Grant (CG) configuration.

SUMMARY

The present disclosure is directed to methods and user equipment (UE) for Configured Grant (CG) configuration.

According to an aspect of the present disclosure, a method performed by a User Equipment (UE) for Configured Grant (CG) configuration is provided. The method includes receiving a Radio Resource Control (RRC) release message from a cell of a Network (NW) while the UE is in an RRC_CONNECTED state, the RRC release message including the CG configuration; entering an RRC_INACTIVE state from the RRC_CONNECTED state in response to the RRC release message; receiving an RRC message from the cell while the UE is in the RRC_INACTIVE state; and determining whether to release the CG configuration based on the RRC message.

According to another aspect of the present disclosure, a User Equipment (UE) in a wireless communication system for a Configured Grant (CG) configuration is provided. The UE includes a processor; and a memory coupled to the processor, wherein the memory stores a computer-executable program that, when executed by the processor, causes the processor to receive a Radio Resource Control (RRC) release message from a cell of a Network (NW) while the UE is in an RRC_CONNECTED state, the RRC release message including the CG configuration; enter an RRC_INACTIVE state from the RRC_CONNECTED state in response to the RRC release message; receive an RRC message from the cell while the UE is in the RRC_INACTIVE state; and determine whether to release the CG configuration based on the RRC message.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

DESCRIPTION

Figure 1:
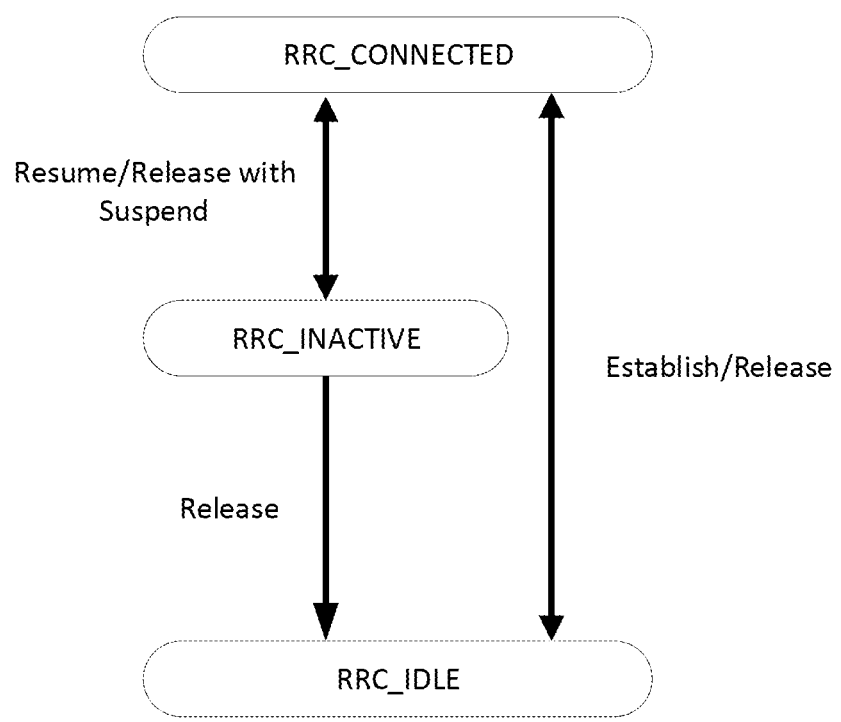
FIG. 1 illustrates an overview of different RRC states of a UE and state transitions in NR, according to an example implementation of the present disclosure.

The acronyms in the present disclosure are defined as follows. Unless otherwise specified, the acronyms have the following meanings.

| Acronym | Full name |
| --- | --- |
| 3GPP | $3^{rd}$ Generation Partnership Project |
| 5GC | 5G Core |
| AMF | Access and Mobility Management Function |
| ARQ | Automatic Repeat Request |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CBRA | Contention Based Random Access |
| CE | Control Element |
| CFRA | Contention Free Random Access |
| CG | Configured Grant |
| CM | Connection Management |
| CN | Core Network |
| C-RNTI | Cell Radio Network Temporary Identifier |
| CS-RNTI | Configured Scheduling Radio Network Temporary Identifier |
| CSI-RS | Channel State Information-Reference Signal |
| DCI | Downlink Control Information |
| DL | Downlink |
| DL-SCH | Downlink-Shared Channel |
| DRB | Data Radio Bearer |
| DRX | Discontinuous Reception |
| HARQ | Hybrid Automatic Repeat Request |
| ID | Identification |
| IE | Information Element |
| I-RNTI | Inactive-Radio Network Temporary Identifier |
| LTE | Long Term Evolution |
| MAC | Medium Access Control |
| MIB | Master Information Block |
| MSG | Message |
| MCG | Master Cell Group |
| NACK/ACK | Non-Acknowledgment/Acknowledgment |
| NAS | Non-Access Stratum |
| NG-RAN | Next-Generation Radio Access Network |
| NR | New Radio |
| NW | Network |
| OFDM | Orthogonal Frequency Division Modulation |
| P-RNTI | Paging Radio Network Temporary Identifier |
| PCell | Primary Cell |
| PCCH | Paging Control Channel |

-continued

| Acronym | Full name |
| --- | --- |
| PDCCH | Physical Downlink Control Channel |
| PDCP | Packet Data Convergence Protocol |
| PDSCH | Physical Downlink Shared Channel |
| PF | Paging Frame |
| PLMN | Public Land Mobile Network |
| PO | Paging Occasion |
| PRACH | Physical Random Access Channel |
| PUCCH | Physical Uplink Control Channel |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |
| RAR | Random Access Response |
| RB | Radio Bearer |
| Rel | Release |
| RLC | Radio Link Control |
| RNA | RAN-based Notification Area |
| RNTI | Radio Network Temporary Identifier |
| RRC | Radio Resource Control |
| RRM | Radio Resource Management |
| RSRP | Reference Signal Receiving Power |
| SCell | Secondary Cell |
| SCG | Secondary Cell Group |
| SDAP | Service Data Adaptation Protocol |
| SFN | System Frame Number |
| SI | System Information |
| SIB | System Information Block |
| SINR | Signal to Interference plus Noise Ratio |
| SNPN | Stand-alone Non-Public Network |
| SpCell | Special Cell |
| SR | Scheduling Request |
| SRB | Signalling Radio Bearer |
| S-TMSI | SAE-Temporary Mobile Subscriber Identity |
| SUL | Supplementary Uplink |
| TA Timer | Timing Alignment timer |
| TAG | Timing Advance Group |
| TB | Transport Block |
| TS | Technical Specification |
| UE | User Equipment |
| UL | Uplink |
| UPF | User Plane Function |

The following may be used to further elaborate terms, examples, embodiments, implementations, actions, behaviors, alternatives, aspects, or claims in the present disclosure:

UE: the UE may be referred to as the PHY/MAC/RLC/PDCP/SDAP entity. The PHY/MAC/RLC/PDCP/SDAP entity may be referred to as the UE.

NW: the NW may be a network node, a Transmission/Reception Point (TRP), a cell (e.g., SpCell, PCell, PSCell, and/or SCell), an eNB, a gNB, and/or a BS.

Serving Cell/Cell: may be a PCell, a PSCell, and/or an SCell. The serving cell may be an activated and/or a deactivated serving cell.

SpCell: for Dual Connectivity operation, the term SpCell may refer to the PCell of the MCG or the PSCell of the SCG depending on whether the MAC entity is associated with the MCG or the SCG. Otherwise, the term SpCell may refer to the PCell. A SpCell supports PUCCH transmission and CBRA, and is always activated.

CC (Component Carrier): the CC may be a PCell, a PSCell, and/or an SCell.

CG configuration: as introduced in 3GPP TS 38.321 V15.7.0, the IE ConfiguredGrantConfig may be used to configure UL transmission without a dynamic grant according to two possible schemes. The UL grant may either be configured via RRC (type1) or provided via the PDCCH (type2). More details are presented subsequently.

The following contains specific information pertaining to implementations of the present disclosure. The drawings and their accompanying detailed disclosure are directed to merely exemplary implementations. However, the present disclosure is not limited to these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

ConfiguredGrantConfig IE

```
-- ASN1START
-- TAG-CONFIGUREDGRANTCONFIG-START
ConfiguredGrantConfig ::=        SEQUENCE {
    frequencyHopping             ENUMERATED {intraSlot, interslot}
OPTIONAL,    -- Need S
    cg-DMRS-Configuration        DMRS-UplinkConfig,
    mcs-Table                    ENUMERATED {qam256, qam64LowSE}
OPTIONAL,    -- Need S
    mcs-TableTransformPrecoder   ENUMERATED {qam256, qam64LowSE}
OPTIONAL,    -- Need S
    uci-OnPUSCH                  SetupRelease { CG-UCI -OnPUSCH }
OPTIONAL,    -- Need M
    resourceAllocation           ENUMERATED { resourceAllocationType0, resourceAllocationType1, dynamicSwitch },
    rbg-Size                     ENUMERATED {config2}
OPTIONAL,    -- Need S
    powerControlLoopToUse        ENUMERATED {n0, n1},
    p0-PUSCH-Alpha               P0-PUSCH-AlphaSetId,
    transformPrecoder            ENUMERATED {enabled, disabled}
OPTIONAL,    -- Need S
    nrofHARQ-Processes           INTEGER (1..16),
    repK                         ENUMERATED {n1, n2, n4, n8},
    repK-RV                      ENUMERATED {s1-0231, s2-0303, s3-0000}
OPTIONAL,    -- Need R
    periodicity                  ENUMERATED {
                                     sym2, sym7, sym1x14, sym2x14, sym4x14, sym5x14, sym8x14, sym10x14,
sym16x14, sym20x14,
                                     sym32x14, sym40x14, sym64x14, sym80x14, sym128x14, sym160x14,
sym256x14, sym320x14, sym512x14,
```

| ConfiguredGrantConfig IE |
|---|

```
                                          sym640x14, sym1024x14, sym1280x14, sym2560x14, sym5120x14,
                                          sym6, sym1x12, sym2x12, sym4x12, sym5x12, sym8x12, sym10x12, sym16x12,
    sym20x12, sym32x12,
                                          sym40x12, sym64x12, sym80x12, sym128x12, sym160x12, sym256x12,
    sym320x12, sym512x12, sym640x12,
                                          sym1280x12, sym2560x12
    },
    configuredGrantTimer                  INTEGER (1..64)
OPTIONAL,    -- Need R
    rrc-ConfiguredUplinkGrant             SEQUENCE {
        timeDomainOffset                  INTEGER (0..5119),
        timeDomainAllocation              INTEGER (0..15) ,
        frequencyDomainAllocation         BIT STRING (SIZE (18)),
        antennaPort                       INTEGER (0..31),
        dmrs-SeqInitialization            INTEGER (0..1)
OPTIONAL,    -- Need R
        precodingAndNumberOfLayers        INTEGER (0..63),
        srs-Resource Indicator            INTEGER (0..15)
OPTIONAL,    -- Need R
        mcsAndTBS                         INTEGER (0..31) ,
        frequencyHoppingOffset            INTEGER (1..maxNrof PhysicalResourceBlocks-1)
OPTIONAL,    -- Need R
        pathlossReferenceIndex            INTEGER (0..maxNrofPUSCH-PathlossReferenceRSs-1),
        . . .
    }
OPTIONAL,    -- Need R
    . . .
}
CG-UCI-OnPUSCH ::= CHOICE {
    dynamic                               SEQUENCE (SIZE (1..4)) OF BetaOffsets,
    semiStatic                            BetaOffsets
}
-- TAG-CONFIGUREDGRANTCONFIG-STOP
-- ASN1STOP
```

| ConfiguredGrantConfig field descriptions |
|---| antennaPort This field indicate the antenna port(s) to be used for this configuration, and the maximum bit width may be 5. See TS 38.214, clause 6.1.2, and TS 38.212, clause 7.3.1.
cg-DMRS-Configuration This field may be DMRS configuration (see TS 38.214, clause 6.1.2.3).
configuredGrantTimer This field may indicate the initial value of the configured grant timer (see TS 38.321) in multiples of periodicity.
dmrs-SeqInitialization The network may configure this field if transformPrecoder is disabled. Otherwise, the field may be absent.
frequencyDomain Allocation
This field may indicate the frequency domain resource allocation, see TS 38.214, clause 6.1.2, and TS 38.212, clause 7.3.1.
frequency Hopping The value intraSlot may enable 'Intra-slot frequency hopping' and the value interSlot may enable 'Inter-slot frequency hopping'. If the field is absent, frequency hopping may be not configured.
frequency HoppingOffset Frequency hopping offset may be used when frequency hopping is enabled (see TS 38.214, clause 6.1.2 and clause 6.3).
mcs-Table This field may indicate the MCS table the UE shall use for PUSCH without transform precoding. If the field is absent, the UE may apply the value qam64.
mcs-TableTransformPrecoder This field may indicate the MCS table the UE may use for PUSCH with transform precoding. If the field is absent, the UE may apply the value qam64.
mcsAndTBS This field may be the modulation order, target code rate and TB size (see TS 38.214, clause 6.1.2). The NW may not configure the values 28~31 in this version of the specification.
nrofHARQ-Processes This field may be the number of HARQ processes configured. It may apply for both Type 1 and Type 2. See TS 38.321, clause 5.4.1.
p0-PUSCH-Alpha This field may be index of the P0-PUSCH-AlphaSet to be used for this configuration.
Periodicity This field may be periodicity for UL transmission without UL grant for type 1 and type 2 (see TS 38.321, clause 5.8.2).
The following periodicities are supported depending on the configured subcarrier spacing [symbols]:
    15 kHz:                 2, 7, n*14, where n={1, 2, 4, 5, 8, 10, 16, 20, 32, 40, 64, 80, 128, 160, 320, 640}
    30 kHz:                 2, 7, n*14, where n={1, 2, 4, 5, 8, 10, 16, 20, 32, 40, 64, 80, 128, 160, 256, 320, 640, 1280}
    60 kHz with normal CP    2, 7, n*14, where n={1, 2, 4, 5, 8, 10, 16, 20, 32, 40, 64, 80, 128, 160, 256, 320, 512, 640, 1280, 2560}
    60 kHz with ECP:       2, 6, n*12, where n={1, 2, 4, 5, 8, 10, 16, 20, 32, 40, 64, 80, 128, 160, 256, 320, 512, 640, 1280, 2560}
    120 kHz:              2, 7, n*14, where n={1, 2, 4, 5, 8, 10, 16, 20, 32, 40, 64, 80, 128, 160, 256, 320, 512, 640, 1024, 1280, 2560, 5120}
powerControlLoopToUse This field may be closed control loop to apply (see TS 38.213, clause 7.1.1).
rbg-Size This field may be selection between configuration 1 and configuration 2 for RBG size for PUSCH. The UE may not apply this field if resourceAllocation is set to resourceAllocationType1. Otherwise, the UE may apply the value config when the field is absent. Note: rbg-Size may be used when the transformPrecoder parameter is disabled.
repK-RV This field may the redundancy version (RV) sequence to use. See TS 38.214, clause 6.1.2. The network may configure this field if repetitions are used, i.e., if repK is set to n2, n4 or n8. Otherwise, the field may be absent.
repK This field may be the number of repetitions of K.
resourceAllocation This field may be configuration of resource allocation type 0 and resource allocation type 1. For Type 1 UL data transmission without grant, resourceAllocation may be resourceAllocationType0 or resourceAllocationType1.

-continued

ConfiguredGrantConfig field descriptions rrc-ConfiguredUplinkGrant This field may be configuration for "configured grant" transmission with fully RRC-configured UL grant (Type1). If this field is absent, the UE may use UL grant configured by DCI addressed to CS-RNTI (Type2). Type 1 configured grant may be configured for UL or SUL, but not for both simultaneously.
srs-ResourceIndicator This field may indicate the SRS resource to be used.
timeDomainAllocation This field may indicate a combination of start symbol and length and PUSCH mapping type, see TS 38.214, clause 6.1.2 and TS 38.212, clause 7.3.1.
timeDomainOffset This field may be offset related to SFN=0, see TS 38.321, clause 5.8.2.
transformPrecoder This field may enable or disable transform precoding for type1 and type2. If the field is absent, the UE may enable or disable transform precoding in accordance with the field msg3-transformPrecoder in RACH-ConfigCommon, see TS 38.214, clause 6.1.3.
uci-OnPUSCH This field may be selection between and configuration of dynamic and semi-static beta-offset. For Type 1 UL data transmission without grant, uci-OnPUSCH may be set to semiStatic.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are not meant to characterize that all implementations of the present disclosure must include the particular feature, structure, or characteristic, and should instead be understood to mean "at least some implementations of the present disclosure" includes the stated particular feature, structure, or characteristic.

The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core Network (5GC), or an Internet), through a RAN established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE Radio Access NW (GERAN), a Next Generation eNB (ng-eNB) as in an E-UTRA BS in connection with the 5GC, a next-generation Node B (gNB) as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or a SCG may be called as a SpCell. A PCell may refer to the SpCell of an MCG. A PSCell may refer to the SpCell of an SCG. MCG refers to a group of serving cells associated with the Master Node (MN), comprising the SpCell and optionally one or more SCells. SCG refers to a group of serving cells associated with the Secondary Node (SN), comprising of the SpCell and optionally one or more SCells.

In some implementations, the UE may not have (LTE/NR) RRC connections with the concerned serving cells of the associated services. In other words, the UE may not have UE-specific RRC signalings exchange with the serving cell. Instead, the UE may only monitor the DL synchronization signals (e.g., DL synchronization burst sets) and/or broadcasting SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The respective portions of the DL transmission data, the guard period, the UL transmission data should also be configurable, for example, based on the NW dynamics of NR. In addition, SL resources may also be provided in an NR frame to support ProSe services.

In some implementations, NR may support RRC_INACTIVE state and UEs with infrequent (periodic and/or non-periodic) data transmission may be generally maintained by the NW in the RRC_INACTIVE state. Until 3GPP TS Rel-16, the RRC_INACTIVE state may not support data transmission. Hence, the UE may need to resume the connection (i.e., switch to RRC_CONNECTED state) for any DL reception and/or UL data transmission. Connection setup and subsequently release to RRC_INACTIVE state may happen for each data transmission regardless of how small and infrequent the data packets are, which may result in unnecessary power consumption and signaling overhead.

Specifically, signaling overhead from RRC_INACTIVE state due to transmission of small data packets may be a problem and become a critical issue as the number of UEs increases in NR, not only for NW performance and efficiency, but also for the UE battery performance. In general, any device that has intermittent small data packets in RRC_INACTIVE state may benefit from enabling small data transmission in RRC_INACTIVE.

The key enablers for small data transmission in NR, specifically the RRC_INACTIVE state, 2-step RACH, 4-step RACH and CG type-1 may have already been specified. The present disclosure builds on these concepts to enable small data transmission in RRC_INACTIVE state for NR.

In some implementations, as introduced in 3GPP TS 38.300 V15.7.0 and 3GPP TS 38.331 V15.7.0, RRC_INACTIVE state may be a state where a UE remains in CM-CONNECTED and may move within an area configured by NG-RAN (i.e., the RNA) without notifying the NG-RAN. In RRC_INACTIVE state, the last serving gNB node may maintain the UE context and the UE-associated NG connection with the serving AMF and UPF.

Please refer to FIG. 1, which illustrates an overview of different RRC states of a UE and state transitions in NR, according to an example implementation of the present disclosure. In some implementations, a UE may have only one RRC state in NR at a time, where the RRC state includes an RRC_CONNECTED state, an RRC_INACTIVE state and an RRC_IDLE state and more details are introduced subsequently.

In some implementations, RRC_INACTIVE state may support at least the following functions, PLMN selection, broadcast of SI, cell re-selection mobility, paging initiated by NG-RAN (i.e., RAN paging), RAN-based notification area (i.e., RNA) managed by NG-RAN, DRX for RAN paging configured by NG-RAN, 5GC-NG-RAN connection (both Control/User-planes) established for UE, the UE AS context stored in NG-RAN and the UE, NG-RAN that knows the RNA which the UE belongs to, and/or, etc., which do not limit the scope of the implementations.

In some implementations, for NR connected to 5GC, the UE identity "I-RNTI" may be used to identify the UE context in RRC_INACTIVE state. Specifically, the I-RNTI may provide the new NG-RAN node a reference to the UE context in the old NG-RAN node. How the new NG-RAN node resolves the old NG-RAN ID from the I-RNTI may be a matter of proper configuration in the old and new NG- RAN node. Some typical partitioning of a 40 bit I-RNTI may assume the following contents:

UE specific reference: may be the reference to the UE context within a logical NG-RAN node.

NG-RAN node address index: may be information to identify the NG-RAN node that has allocated the UE specific part.

PLMN-specific information: may be information supporting NW sharing deployments, providing an index to the PLMN ID part of the Global NG-RAN node identifier.

SNPN-specific information: may be a small PLMN configured by the operator, where each SNPN may be identified by a unique SNPN identity (e.g., an identifier of an SNPN comprising of a PLMN ID and an NID combination). A CG configuration may be associated with an SNPN ID.

UE Inactive AS Context

In some implementations, UE Inactive AS Context may be stored when the connection is suspended (e.g., when the UE is in RRC_INACTIVE state) and may be restored when the connection is resumed (e.g., when the UE is transited from RRC_INACTIVE state to RRC_CONNECTED state).

In some implementations, the suspension of the RRC connection may be initiated by the NW. When the RRC connection is suspended, the UE may store the UE Inactive AS context and any configuration (e.g., CG configuration) received from the NW and transition to RRC_INACTIVE state. If the UE is configured with SCG, the UE may release the SCG configuration upon initiating a RRC Connection Resume procedure. The RRC message to suspend the RRC connection may be integrity protected and ciphered.

The resumption of a suspended RRC connection may be initiated by upper layers when the UE needs to transition from RRC_INACTIVE state to RRC_CONNECTED state or by RRC layer to perform an RNA update or by RAN paging from NG-RAN. When the RRC connection is resumed, the NW may configure the UE according to the RRC connection resume procedure based on the stored UE Inactive AS context and any RRC configuration received from the NW. The RRC connection may resume procedure re-activates AS security and re-establish SRB(s) and/or DRB(s).

In some other implementations, in response to a request to resume the RRC connection, the NW may resume the suspended RRC connection and instruct the UE to transition to RRC_CONNECTED state, or reject the request to resume and instruct the UE to transition to RRC_INACTIVE state (with a waiting timer), or directly re-suspend the RRC connection and instruct the UE to transition to RRC_INACTIVE state, or directly release the RRC connection and instruct the UE to transition to RRC_IDLE state, or instruct the UE to initiate NAS level recovery (e.g., the NW sends an RRC setup message).

In some implementations, in the RRC_INACTIVE state, a UE specific DRX may be configured by upper layers or by the RRC layer, UE controlled mobility may be based on a NW configuration, the UE may store the UE Inactive AS context, and a RAN-based notification area may be configured by the RRC layer. Furthermore, the UE may perform the following in RRC_INACTIVE state:

Monitor Short Messages transmitted with P-RNTI over DCI.

Monitor a Paging channel for CN paging using 5G-S-TMSI and RAN paging using full I-RNTI.

Perform neighboring cell measurements and cell (re-) selection.

Perform RNA updates periodically and when moving outside the configured RNA.

Acquire SI and send SI request (if configured).

Perform small data transmission.

RA Procedure

In some implementations, there may be two types of RA procedure supported, specifically 4-step RA type (with MSG1), e.g., CFRA and/or 4-step CBRA, and 2-step RA type (with MSGA), e.g., 2-step CFRA and/or 2-step CBRA.

In some implementations, the UE may select the type of RA based on a NW configuration and/or RSRP of the DL pathloss reference. The NW may not configure CFRA with MSG1 (i.e., 4-step CFRA) and CFRA with MSGA (i.e., 2-step CFRA) at the same time for a Bandwidth Part (BWP.) More details may be introduced as follows.

When CFRA is not configured, an RSRP threshold may be used by the UE to select between 2-step RA type and 4-step RA type at initiation of the RA procedure.

When CFRA with dedicated MSG1 is configured, UE may select 4-step RA type at the initiation of the RA procedure.

When CFRA with dedicated MSGA is configured, UE may select 2-step RA type at the initiation of the RA procedure.

Configured UL Grant

In some implementations, as introduced in 3GPP TS 38.300 V15.7.0 and 3GPP TS 38.321 V15.7.0, in the UL, the gNB may dynamically allocate resources to UEs via the C-RNTI on PDCCH(s). A UE may always monitor the PDCCH(s) in order to receive possible grants for UL transmission when its DL reception is enabled (e.g., activity governed by DRX when configured). When CA is configured, the same C-RNTI may apply to all serving cells.

In some implementations, with CGs (may also be referred to as configured UL grants), the gNB may allocate UL resources for the initial HARQ transmissions to UEs. Two types of configured UL grants may be defined as follows:

With CG type 1, RRC may directly provide the configured UL grant (e.g., including the periodicity).

With CG type 2, RRC may define the periodicity of the configured UL grant while PDCCH addressed to CS-RNTI may either signal and activate or deactivate the configured UL grant; i.e., a PDCCH addressed to CS-RNTI indicates that the UL grant may be implicitly reused according to the periodicity defined by RRC, until deactivated.

Specifically, CG type 1 and type 2 may be configured by RRC per Serving Cell and per BWP. Multiple configurations may be active simultaneously only on different Serving Cells. For Type 2, activation and deactivation may be independent among the Serving Cells. For the same Serving Cell, the MAC entity may be configured with either CG type 1 or type 2.

In some implementations, RRC may configure (but not limited to) the following parameters when the CG type 1 is configured:

cs-RNTI: may be for retransmission;

periodicity: may be periodicity of the CG type 1;

timeDomainOffset: may be an offset of a resource with respect to SFN=0 in a time domain;

timeDomainAllocation: may be an allocation of a configured UL grant in a time domain which contains startSymbolAndLength (i.e., SLIV in TS 38.214);

nrofHARQ-Processes: may be the number of HARQ processes for CG.

In some implementations, upon configuration of a CG type 1 for a Serving Cell by upper layers, the MAC entity may store the UL grant provided by upper layers as a configured UL grant for the indicated Serving Cell; and/or initialise/re-initialise the configured UL grant to start in the symbol according to time DomainOffset and S (derived from SLIV as specified in 3GPP TS 38.214), and to reoccur with periodicity.

In some other implementations relating to and associated with NR, small UL data transmission in RRC_INACTIVE state has been preliminarily studied. The solution for UL small data transmission in RRC_INACTIVE state may be service-agnostic, with respect to different service requirements. In some implementations, one or more of the following characteristics for a candidate solution may be applied:

Small data transmission may both operate with RACH-based schemes (e.g., 2-step and/or 4-step RACH procedure) and/or pre-configured PUSCH resources (e.g., the CG type 1).

The UE AS context identifier (e.g., UE Inactive AS Context) used for UL data transmission in RRC_INACTIVE state may be the same as the context identifier used in state transition from RRC_INACTIVE state to RRC_CONNECTED state. The UE AS context may be located and identified in the NW via an "AS Context ID", which may be allocated by the NW and stored in the UE (and the NW) when the UE transitions to RRC_INACTIVE state and used to locate the AS context when the UE either tries to transmit small data and/or to perform a transition to RRC_CONNECTED state. The UE AS Context may be stored in an "anchor"/source gNB and may be fetched to the new serving gNB when needed upon the triggering of small data transmission and/or transition from RRC_INACTIVE state to RRC_CONNECTED state.

Small data transmission may use the AS Context ID transmitted in the "first" message for contention resolution (e.g., at least when RACH is used). After the "first" message with small UL data is received, the NW may be able to inform the UE that it may transition to RRC_CONNECTED state via a DL RRC message (e.g., RRCConnectionResume). The "first" message with small UL data may provide information to enable the NW to apply overload control and prioritization, if needed.

Transmission of large data may cause a state transition to RRC_CONNECTED state. The state transition may be a NW decision.

The UE may provide in the "first" message with the initial UL data transmission all necessary information to enable the NW to indicate to the UE to transition to RRC_CONNECTED state or to enable the NW to indicate to the UE to remain in RRC_INACTIVE state, e.g., BSR.

Subsequent small uplink data transmissions (e.g., transmissions after the first UL data) in RRC_INACTIVE state may be supported.

It may be beneficial to send small DL data to the UE with the NW response message (e.g., MSG4/MSGB) if user plane data are available if the user plane design supports it.

Small data transmission solution may support at least an RLC ARQ mechanism.

The NW may have the ability to perform a context update when the UE sends small data in RRC_INACTIVE state. The context update may rely on RRC signalling and may be performed in the "second" message (e.g., RRCConnectionResume or a control response message triggered by small data transmission).

The following characteristics may be introduced for small data transmission:

The UE context in RRC_INACTIVE state may include (but not limited to) the configuration of radio bearers (e.g., the DRBs and/or SRBs), logical channels and/or security. The UE may maintain the same PDCP entity as in RRC_CONNECTED state and maintain the PDCP COUNT and Sequence Number (SN) of the PDCP.

The NW may indicate to the UE to transition to RRC_CONNECTED state in response to UL data transmission if necessary. UE ID may uniquely identify the UE context in the RAN. The UE context may be maintained in an anchor gNB.

The UE may decide whether to use small data transmission based on a threshold related to or associated with at least the amount of data in the UE's buffer. If amount of data is higher than the threshold, UE may initiate an RRC procedure (e.g., a RRC connection resume procedure) to transition to RRC_CONNECTED state.

One or multiple DRBs (and/or SRBs) may be maintained in RRC_INACTIVE state, and data transmission may be performed on the DRB associated with the corresponding service. Specifically, one or more DRBs and/or SRBs may be specifically configured for small data transmission. For example, the UE may be indicated (from NW) that some of the DRBs and/or SRBs can be used for small data transmission while the other DRBs and/or SRBs cannot be used for small data transmission.

Transition from RRC_INACTIVE state to RRC_CONNECTED state based on a 3-step RRC procedure may be a baseline and 2-step RRC procedure (resume request, resume) may be further studied.

MSG 3/MSGA ("RRC Connection Resume Request") may include at least the required information for the NW to perform contention resolution, identify the UE AS context and verify the correct UE. The UE may be able to encrypt the small UL data transmission in RRC_INACTIVE state.

Upon receiving the MSG4/MSGB response from the NW (e.g., "RRC Connection Resume"), the UE may identify the correct NW, perform contention resolution and receive DL data and either remain in RRC_INACTIVE state or resume its previously suspended connection, i.e., transiting to RRC_CONNECTED state.

DL transmissions/responses and subsequent transmissions may be supported without the UE having to transition to RRC_CONNECTED state.

HARQ ACK/NACK transmission may be supported when MSG3/MSGA is transmitted (i.e., UE may be expected to continuously monitor the PDCCH once it sends a first UL packet, and DL RLC ACK/NACK messages may be scheduled normally when a UE continues to listen to the DL channels).

The UE may provide information to enable the NW to decide whether to have the UE transition from RRC_INACTIVE state or transition to RRC_CONNECTED state.

For small data transmission in RRC_INACTIVE state, the UE may use a currently configured DRB(s).

Configurations to Support Small Data Transmission in RRC_INACTIVE State

The small data transmission may be supported while the UE is in RRC_INACTIVE state. Based on the RRC state machine and state transitions as illustrated in FIG. 1, the RRC state of the UE may be controlled by the NW. The NW may indicate to the UE to transition from RRC_CONNECTED state to RRC_INACTIVE state via an RRC release message with a suspend configuration (e.g., the RRCRelease includes suspendConfig). The RRC state of the UE may not be switched to RRC_INACTIVE state from RRC_IDLE state. The configurations (e.g., RACH configurations, CG configurations, RB configurations, TA configuration, BWP configurations, etc.) for small data transmission may be configured via an RRC release message, e.g., the RRC release message with the suspend configuration. In addition, if the UE is in RRC_INACTIVE state, the NW may (re-) configure the configuration(s) for small data transmission via another RRC release message, paging and/or SI.

The configurations for small data transmission may refer to at least one of the following configurations, which may be applied by the (e.g., if the UE is configured to support small data transmission in RRC_INACTIVE state).

RACH configuration: a specific (group of) preamble(s) and/or PRACH resource(s) for small data transmission may be configured. The specific preamble(s) and/or PRACH resource(s) may be associated with a specific grant size for MSG3. The UE may select the preamble and/or PRACH resource to initiate a RA procedure for small data transmission based on some criteria (e.g., based on buffer status, channel quality, etc.).

2-step RACH configuration: a specific (group of) preamble(s), PRACH resource(s), and/or MSGA PUSCH(s) for small data transmission may be configured. The UE may select the preamble, PRACH resource, and/or the associated MSGA PUSCH based on some criteria (e.g., based on buffer status, channel quality, etc.).

CG configuration: may include one or more than one of the parameters/IEs as listed in the IE ConfiguredGrantConfig from the 3GPP TS 38.321 V15.7.0 (e.g., the periodicity of the CG, the size of the UL resource, the duration of the UL resource, etc.) and/or other parameters (e.g., a number/counter which may be used for the release of the CG, a TA timer for TA validity, a threshold for the change of RSRP, a time offset, a UE-specific RNTI (e.g., C-RNTI), a CG ID, and/or a timer/time window for the response of the CG, etc.). The CG configuration may be CG type 1 and/or CG type 2. The CG may be a contention-based resource and/or a contention free resource. The CG may only be used in RRC_INACTIVE state and/or may be used in both RRC_CONNECTED state and RRC_INACTIVE state. The CG may be a dedicated UL resource for a UE. The UE may be configured with multiple CG configurations (e.g., used for transmission for different services in RRC_INACTIVE state). More specifically, the number of transmissions via the CG may be configured in the CG configuration. For example, if the number is 2, the UE may only use the CG twice for transmission. In one example, the UE may maintain a counter, the UE decrementing the counter after each transmission via the CG. More specifically, a timer may be in the CG configuration. More specifically, the timer (e.g., configured via the CG configuration), may be used to indicate whether the CG is valid or not. The CG may be considered valid while the timer is running. Specifically, the timer may be a TA timer and/or a specific timer.

RB configuration: one or more of the specific SRB(s) and/or DRB(s) may be configured for small data transmission in RRC_INACTIVE state. For example, the specific SRB and/or DRB may not be suspended (e.g., may be maintained/resumed) when the UE is in RRC_INACTIVE state (e.g., after receiving the RRC release with an IE suspendConfig).

BWP indicator: a specific BWP (ID) may be configured for the UE to use in RRC_INACTIVE state (e.g., for small data transmission). For example, if the UE receives the BWP indicator, the UE may switch the BWP to the indicated BWP when entering RRC_INACTIVE state.

UE ID: the UE ID may correspond to a specific RNTI (e.g., C-RNTI, I-RNTI, fullI-RNTI, shortI-RNTI, and/or a specific RNTI for CG and/or small data transmission, etc.), UE AS context ID, and/or UE inactive AS context, etc. The UE ID may be transmitted together with the small data transmission. For example, the UE ID may be transmitted via MSG1, MSG3, MSGA PUSCH, and/or a UL resource derived from the CG. The UE ID may be used by the UE for the request of CG for small data transmission.

TA configuration: a specific TA timer may be configured for the UE in RRC_INACTIVE state. For example, when the UE receives a specific Timing Advance command (e.g., via paging message, short message, and/or other DL signalling (e.g., via PDCCH, RAR, MSGB, MAC CE, and/or a specific DCI format)), the UE may apply the timing advance command and/or (re-) start the specific TA timer. The timing advance command may be used to update the TA value for UL synchronization. While the specific TA timer is running, the UE may consider the TA valid (i.e., the UL is time aligned). If the specific TA timer expires or is not running, the UE may consider the TA not valid (i.e., the UL is not time aligned). The UE may only use the CG for UL transmission in RRC_INACTIVE state if the TA is considered valid. Otherwise, the UE may initiate a RRC connection resume procedure and/or a RA procedure if the TA is considered not valid.

Paging configuration: paging cycle may be configured.

RAN notification area configuration: may include a list of cell IDs, a RAN area configuration list, a list of RAN area codes (RANACs), and/or a list of tracking area codes. A specific timer for RAN notification area may be configured (e.g., similar to t380 as introduced in 3GPP TS 38.331 V15.7.0).

In some implementations, when the UE (e.g., in RRC_CONNECTED state) receives the configuration(s) for small data transmission (e.g., via an RRC release message), the UE may transition from RRC_CONNECTED to RRC_INACTIVE state, and apply the configuration(s) for small data transmission. The UE may perform UL or DL data transmission while the UE is in RRC_INACTIVE state based on the configuration(s) for small data transmission. Furthermore, the UE may (or may not) reset the MAC after receiving the configuration(s) for small data transmission (e.g., via an RRC release message). The UE may (or may not) release the default MAC Cell Group configuration after receiving the configuration(s) for small data transmission (e.g., via an RRC release message). The UE may not suspend (or may resume) some SRBs and/or DRBs indicated by the configuration(s) for small data transmission after receiving the configuration(s) for small data transmission (e.g., via an RRC release message). Alternatively, some default SRBs and/or DRBs, which may be specified in the configuration(s) or in the 3GPP TS for small data transmission.

The UE may be configured with CG for small data transmission in RRC_INACTIVE state. In order to support this functionality, one issue is how and/or when to (re-) configure and/or (re-) initialize the corresponding CG configurations/resources(s) provided to the UE. If the UE is configured with CG(s), and/or the configuration is initialized, the UE may perform the transmission via the CG (e.g., via the UL resource of the CG) in RRC_INACTIVE state.

Specifically, assuming that a UE is in RRC_CONNECTED state, the UE may be configured with a CG configuration via RRC signaling from the NW. For example, the CG configuration may be provided via the IE configuredGrantConfig, where configuredGrantConfig may be included in the BWP-UplinkDedicated IE as illustrated in Table 1. Based on this configuration, the CG configuration may be associated with a (dedicated) BWP.

The CG configuration which is configured when the UE is in RRC_CONNECTED state may be applied when/after the UE is switched from RRC_CONNECTED state to RRC_INACTIVE state, e.g., the CG configuration configured by the NW when the UE is in the RRC_CONNECTED state may be further applied while the UE is in the RRC_INACTIVE state. For example, the CG configuration which is configured (e.g., in the BWP-UplinkDedicated and/or configured in a specific BWP (e.g., initial BWP, default BWP, and/or etc.)) when the UE is in RRC_CONNECTED state may not be released or cleared when the UE is switched to RRC_INACTIVE state. In legacy mechanism, if the UE receives the RRC release with an IE suspendConfig, the UE may reset MAC. If the UE resets MAC, the UE may consider all timeAlignmentTimers as expired and clear any configured DL assignments and configured UL grants. Therefore, if the CG configuration configured in the RRC_CONNECTED state is supported to be applied in the RRC_INACTIVE state, the CG configuration may be maintained, stored and/or not cleared when the UE enters the RRC_INACTIVE state.

(e.g., IE suspendConfig) and/or a specific configuration for small data transmission, the UE may enter RRC_INACTIVE state, and the UE may suspend (one or multiple of) the CG configuration(s).

In one example, when the UE receives the RRC release message (e.g., RRC release) and/or a suspend command (e.g., IE suspendConfig) and/or a specific configuration for small data transmission, the UE may enter RRC_INACTIVE state, and the UE may (re-) initialize/activate one or multiple of the CG configuration(s).

In some aspects, the NW may indicate which (one or multiple) specific CG configuration(s) may not be cleared/released, may be stored, may be suspended, and/or may be (re-) initialized (e.g., via an RRC release message (with an IE suspendConfig and/or with a specific configuration for small data transmission)).

In some aspects, the specific CG configuration(s) that may not be cleared/released, may be stored, may be suspended, and/or may be (re-) initialized/activated, may be associated with specific configuration(s). For example, the UE may release or clear (all) the CG configurations configured via the IE configuredGrantConfig (e.g., the CG configuration that may only be applied for transmission in RRC_CONNECTED state). The UE may not release or clear the CG configuration that is configured via another IE (e.g., the IE included in the RRC release message that may only be used for transmission in RRC_INACTIVE state). The UE may store, suspend, and/or (re-) initialized the CG configuration

TABLE 1

| BWP-UplinkDedicated IE | | |
|---|---|---|
| -- ASN1START | | |
| -- TAG-BWP-UPLINKDEDICATED-START | | |
| BWP-UplinkDedicated ::=  SEQUENCE { | | |
|    pucch-Config | SetupRelease { PUCCH-Config } | OPTIONAL, -- |
| Need M | | |
|    pusch-Config | SetupRelease { PUSCH-Config } | OPTIONAL, -- |
| Need M | | |
|    configuredGrantConfig | SetupRelease { ConfiguredGrantConfig } | OPTIONAL, -- |
| Need M | | |
|    srs-Config | SetupRelease { SRS-Config } | OPTIONAL, -- |
| Need M | | |
|    beamFailureRecoveryConfig | SetupRelease { BeamFailureRecoveryConfig } | OPTIONAL, -- |
| Cond SpCellOnly | | |
| . . . | | |
| } | | |
| -- TAG-BWP-UPLINKDEDICATED-STOP | | |
| -- ASN1STOP | | |

In one example, when the UE receives the RRC release message (e.g., also called RRC release) and/or a suspend command (e.g., IE suspendConfig) and/or a specific configuration for small data transmission, the UE may enter RRC_INACTIVE state.

In one example, when the UE receives the RRC release message (e.g., RRC release) and/or a suspend command (e.g., IE suspendConfig) and/or a specific configuration for small data transmission, the UE may enter RRC_INACTIVE state, and the UE may not clear/release (one or multiple of) the CG configuration(s).

In one example, when the UE receives the RRC release message (e.g., RRC release) and/or a suspend command (e.g., IE suspendConfig) and/or a specific configuration for small data transmission, the UE may enter RRC_INACTIVE state, and the UE may store the (one or multiple) CG configuration(s).

In one example, when the UE receives the RRC release message (e.g., RRC release) and/or a suspend command that is configured via another IE (e.g., the IE included in the RRC release message that may only be used for transmission in RRC_INACTIVE state).

In some aspects, the specific CG configuration(s) that may not be cleared/released, may be stored, may be suspended, and/or may be (re-) initialized/activated, may depend on the BWP or cell to which the CG configuration(s) belongs.

For example, if the UE receives the RRC release message (with an IE suspendConfig and/or with a specific configuration for small data transmission), the UE may enter RRC_INACTIVE state, and the UE may not clear/release (one or multiple of) the CG configuration(s) from (one or more) specific BWP(s). The CG configuration(s) of other BWP(s) may be cleared/released.

For example, if the UE receives the RRC release message (with an IE suspendConfig and/or with a specific configuration for small data transmission), the UE may enter RRC_INACTIVE state, and the UE may store (one or multiple of) the CG configuration(s) from (one or more) specific BWP(s).

For example, if the UE receives the RRC release message (with an IE suspendConfig and/or with a specific configuration for small data transmission), the UE may enter RRC_INACTIVE state, and the UE may suspend (one or multiple of) the CG configuration(s) from (one or more) specific BWP(s).

For example, If the UE receives the RRC release message (with an IE suspendConfig and/or with a specific configuration for small data transmission), the UE may enter RRC_INACTIVE state, and the UE may (re-) initialize/activate (one or multiple of) the CG configuration(s) of (one or more of) specific BWP.

For example, if the UE receives the RRC release message (with an IE suspendConfig and/or with a specific configuration for small data transmission), the UE may enter RRC_INACTIVE state, and the UE may not clear/release (one or multiple of) the CG configuration(s) from (one or more) specific BWP(s) in the SpCell. The CG configuration(s) configured in the SCell(s) may be cleared/released.

The specific BWP may be an initial BWP, a default BWP, a BWP that is explicitly indicated by the NW (e.g., indicated in the configuredGrantConfig IE or indicated in the RRC release message with an IE suspendConfig), and/or a specific BWP for UL transmission in RRC_INACTIVE state. The specific BWP may be configured in the BWP-UL IE. Alternatively, the specific BWP may be indicated via the RRC release message (with an IE suspendConfig). Alternatively, the specific BWP may be indicated via the corresponding small data transmission configuration(s).

If the UE receives the RRC release message (with an IE suspendConfig and/or with a specific configuration for small data transmission), the UE may not consider TA timer expires. If the UE receives the RRC release message (with an IE suspendConfig and/or with a specific configuration for small data transmission), the UE may maintain a TA timer in RRC_INACTIVE state. If the UE receives the RRC release message (with an IE suspendConfig and/or with a specific configuration for small data transmission), the UE may (re-) start the TA timer.

The TA timer may be associated with a cell or a cell of a TAG which is configured with the CG configuration and/or associated with a SpCell. The UE may clear the CG resource and/or release the CG configuration while the TA timer is not running or upon the TA timer expiring. The TA timer that is running while the UE is in RRC_CONNECTED state may be kept running while the UE is in RRC_INACTIVE state. The TA timer may be a timeAlignmentTimer configured in RRC_CONNECTED state. The TA timer may be a specific timer configured for RRC_INACTIVE state (e.g., the corresponding configuration for TA timer may be indicated together with the RRC release message (with an IE suspendConfig and/or with a specific configuration for small data transmission). The TA timer may be (re-) started upon receiving a Timing Advance command via a paging message, a short message, an RAR message (e.g., MSG2), specific DL signalling (e.g., via PDCCH/DCI/MAC CE/RRC), and/or MSGB (e.g., when the UE is in RRC_INACTIVE state).

In some implementation, when the UE receives the Timing Advance command via the paging message from the NW, the UE may (re-) start the corresponding TA timer (e.g., if the ue-Identity included in the PagingRecord matches the UE's identity and/or stored fulII-RNTI). The UE may only apply the Timing Advance command from the paging message if the ue-Identity included in the PagingRecord matches the UE's identity and/or stored fulII-RNTI.

In other implementations, when the UE receives the Timing Advance command via the short message from the NW, the UE may (re-) start the corresponding TA timer (e.g., if the short message is transmitted for the UE (e.g., based on a UE identity)). If the UE receives the RRC release message (with an IE suspendConfig and/or with a specific configuration for small data transmission), the UE may not reset the MAC and/or only partially reset the MAC (e.g., an indication may be included in the RRC release message (with an IE suspendConfig to indicate this information)). The UE may reset the MAC if the specific configuration for small data transmission and/or the CG configuration in RRC_CONNECTED state is not initialized (e.g., if the CG configuration has been cleared/released).

If the UE receives the RRC release message (with an IE suspendConfig and/or with a specific configuration for small data transmission), the UE may reset the MAC (e.g., based on an indication included in the RRC release message (with an IE suspendConfig to indicate this information)), and the UE may perform the following:

Initialize Bj for each logical channel to zero.
Stop all running timers and/or partially stop some timers introduced in 3GPP TS 38.321 V15.7.0. For example, the CG related timers may not be stopped. The BWP related timers may not be stopped. The TA timer may not be stopped, etc.
Consider all timeAlignmentTimers expired and perform the corresponding actions as introduced in 3GPP TS 38.321 V15.7.0.
Set the New Data Indicators (NDIs) for all UL HARQ processes to 0.
Stop any ongoing RACH procedure.
Discard any explicitly signaled CFRA Resources.
Flush the MSG3 buffer.
Cancel any triggered SR procedure.
Cancel any triggered BSR procedure.
Cancel any triggered Power Headroom Reporting procedure.
Flush the soft buffers for all DL HARQ processes.
For each DL HARQ process, consider the next received transmission for a Transport Block (TB) as the first transmission.
Release any Temporary C-RNTI.
Reset the BFI_COUNTER.

If the UE receives the RRC release message with an IE suspendConfig (and/or with a specific configuration for small data transmission), the UE may partially reset the MAC (e.g., based on an indication included in the RRC release message (with an IE suspendConfig)), and the UE may perform one or more of the following:

Initialize Bj for each logical channel to zero.
Stop all running timers and/or partially stop some timers introduced in 3GPP TS 38.321 V15.7.0. For example, the CG related timers may not be stopped. The BWP related timers may not be stopped. The TA timer may not be stopped, etc.
Consider all timeAlignmentTimers expired and perform the corresponding actions as introduced in 3GPP TS 38.321 V15.7.0.
Set the New Data Indicators (NDIs) for all UL HARQ processes to 0.
Stop any ongoing RACH procedure.
Discard explicitly signalled CFRA Resources, if any;
Flush the MSG3 buffer.
Cancel any triggered SR procedure.

Cancel any triggered BSR procedure.

Cancel any triggered Power Headroom Reporting procedure.

Flush the soft buffers for all DL HARQ processes.

For each DL HARQ process, consider the next received transmission for a Transport Block (TB) as the first transmission.

Release any Temporary C-RNTI.

Reset the BFI_COUNTER.

The UE may not consider all TA timers expired (e.g., one or more of the TA timers may keep running).

In some implementations, when the UE enters RRC_INACTIVE state, the UE may transmit an indication or signaling to inform the NW if the UE initializes the CG configuration. For example, when/after the UE initializes the CG configuration, the UE may transmit the indication to the NW.

The indication may be transmitted to the NW via RRC/MAC/PHY signaling.

Alternatively, when the UE enters RRC_INACTIVE state and/or the UE has initialized the CG configuration, the UE may trigger a procedure to generate the indication. Alternatively, the indication may be transmitted to the NW via a resource provided by the (first) CG configuration (e.g., after initializing/activating the CG).

Alt. 1: CG Configuration May be Included in RRC Release Message.

In some implementations, a CG configuration may be included in the configuration(s) for small data transmission. The corresponding configuration(s) for small data transmission may be configured via an RRC release message (with an IE suspendConfig). The configuration(s) for small data transmission are provided in the present disclosure.

In some implementations, the UE may (re-) initialize the CG configuration if the UE receives the CG configuration (e.g., when the UE enters RRC_INACTIVE state).

In some implementations, the UE may (re-) initialize the CG configuration if the UE receives the RRC release message (e.g., when the UE enters RRC_INACTIVE state).

In some implementations, the CG configuration may include one or more of the parameters listed in the IE ConfiguredGrantConfig introduced in 3GPP TS 38.321 V15.7.0 (e.g., the periodicity, the (payload) size, the duration, etc.) and/or other parameters not introduced in 3GPP TS 38.321 V15.7.0 (e.g., a number used for the (implicit) release of the CG, TA timer for TA validity, RSRP change threshold, time offset, UE-specific RNTI, CG configuration index, and/or a timer/time window for the response, etc.) The CG configuration may be CG type 1. The CG may be a contention-based resource or a contention free resource. The CG may only be applied while the UE is in RRC_INACTIVE state (e.g., the CG configuration may not be applied while the UE is in the RRC_CONNECTED state).

If the UE receives the RRC release message, the configuration(s) for small data transmission, and/or the CG configuration, the UE may (re-) initialize the CG configuration. More specifically, the UE may (re)-initialize the CG when the UE enters RRC_INACTIVE state.

If the UE receives the RRC release message, the configuration(s) for small data transmission, and/or the CG configuration, the UE may determine whether to initialize the CG configuration based on a specific indication. The specific indication may be provided via the configuration(s) for small data transmission. More specifically, the UE may (re-) initialize the CG when the UE enters RRC_INACTIVE state.

More specifically, the UE may or may not release/clear the CG configuration (resource) configured while the UE is in the RRC_CONNECTED state in a case that the UE enters from RRC_CONNECTED state to RRC_INACTIVE state.

The UE may use DRX in RRC_IDLE state and/or RRC_INACTIVE state in order to reduce power consumption. The UE may monitor one PO per DRX cycle. A PO may be a set of PDCCH monitoring occasions and may consist of multiple time slots (e.g. subframe or OFDM symbol) where paging DCI can be sent as described in 3GPP TS 38.213 V15.7.0). One PF is one Radio Frame and may contain one or multiple PO(s) or starting point of a PO. The PDCCH monitoring occasions for paging may be determined according to pagingSearchSpace as specified in 3GPP TS 38.213 and firstPDCCH-MonitoringOccasionOfPO if configured as specified in 3GPP TS 38.331. When SearchSpaceId=0 is configured for pagingSearchSpace, the PDCCH monitoring occasions for paging may be the same as for RMSI as defined in 3GPP TS 38.213 V15.7.0.

For short message reception in a PO, the UE may monitor the PDCCH monitoring occasion(s) for paging as specified in 3GPP TS 38.304 V15.6.0 and in 3GPP TS 38.213 V15.7.0.

SI may consist of a MIB and a number of SIBs, which are divided into Minimum SI and other SI. The MIB may be mapped on the BCCH and carried on BCH while all other SI messages may be mapped on the BCCH, where they are dynamically carried on DL-SCH. The scheduling of SI messages that are part of other SI may be indicated by SIB1. For UEs in RRC_IDLE state and RRC_INACTIVE state, a request for other SI may trigger a RA procedure where MSG3 includes the SI request message unless the requested SI is associated with a subset of the PRACH resources, in which case MSG1 is used for indication of the requested other SI. When MSG1 is used, the minimum granularity of the request may be one SI message (i.e., a set of SIBs), one RACH preamble and/or PRACH resource may be used to request multiple SI messages and the gNB acknowledges the request in MSG2. When MSG 3 is used, the gNB may acknowledge the request in MSG4. The other SI may be broadcast at a configurable periodicity and for a certain duration. The other SI may also be broadcast when it is requested by UE in RRC_IDLE/RRC_INACTIVE state.

Alt. 2: CG Configuration May be (Re-) Configured/(Re-) Initialized by Short Message.

The CG configuration may be (re-) configured/(re-) initialized by short message (e.g., via a DCI). Short Messages may be transmitted on PDCCH using P-RNTI with or without associated paging message using Short Message field in DCI format 1_0. For example, one or more than one of the bits of the short message may be used to (re-) configured/(re-) initialized the CG.

Upon the UE receiving the short message, the UE may or may not check if the short message is transmitted for the UE (e.g., based on a UE identity). The UE may apply and/or (re-) configure/(re-) initialize the CG configuration indicated by short message (e.g., if the short message is transmitted for the UE). More specifically, the UE may ignore the short message if the short message is not transmitted for the UE. More specifically, the UE may ignore the information of a CG configuration(s) included in short message if the corresponding CG (which is indicated by the short message) has been initiated.

The UE may be configured multiple CG configurations. The short message may be used to indicate which CG configuration(s) may be (re-) initialized.

Alt. 3: CG Configuration May be (Re-) Configured/(Re-) Initialized by SI.

The CG configuration may be (re-) configured/(re-) initialized by SIB and/or MIB. For example, an SI (e.g., the SIB and/or MIB) may contain information of a CG configuration(s).

In one example, upon the UE receiving the SI, the UE may or may not check if the SI is transmitted for the UE (e.g., based on a UE identity). The UE may apply and/or (re-) configure/(re-) initialize the CG configuration indicated by SI (e.g., if the SI is transmitted for the UE). More specifically, the UE may ignore the SI if the SI is not transmitted for the UE. More specifically, the UE may ignore the information of a CG configuration(s) included in SI if the corresponding CG (which is indicated by the SI) has been initiated.

In one example, the UE may be configured multiple CG configurations. The SI may be used to indicate which CG configuration(s) may be (re-) initialized. (e.g., via an index which may be associated with CG configuration(s) (index)). For example, a specific indicator may be transmitted via the short message to indicate which CG configuration may be initialized. If the indicator indicates a first index, the UE may only initialize the CG configuration with the first index. More specifically, more than one of the CG may be initialized/activated simultaneously.

Alt. 4: CG Configuration May be (Re-) Configured/(Re-) Initialized by a Specific Message.

The CG configuration may be (re-) configured/(re-) initialized by a specific message (e.g., for small data transmission). More specifically, the specific message (e.g., may be PHY signalling) may be indicated via a DCI format with CRC scrambled by a specific RNTI (e.g., C-RNTI, I-RNTI, P-RNTI, and/or a specific RNTI for small data transmission, etc.)

The specific message may be an RRC message (e.g., RRC release message and/or with suspend command (e.g., IE suspendConfig) and/or with a specific configuration for small data transmission), which may be used to (re-) configure/(re-) initializethe CG configuration(s).

The UE may or may not check if the specific message is transmitted for the UE (e.g., based on the specific RNTI (e.g., C-RNTI, I-RNTI, P-RNTI, and/or a specific RNTI for small data transmission, etc.) and/or a UE identity). The UE may apply and/or (re-) configure/(re-) initialize the CG configuration indicated by the specific message (e.g., if the specific message is transmitted for the UE). The UE may be configured with multiple CG configurations. The specific message may be used to indicate which CG configuration(s) may be (re-) configured/(re-) initialized. The specific message may be received on the PDCCH and/or on the PDSCH.

Upon the UE receiving the specific message, the UE may check if the specific RNTI (e.g., C-RNTI, I-RNTI, P-RNTI, and/or a specific RNTI for small data transmission, etc.) and/or the UE identity (of the specific message) matches the UE's identity and/or stored RNTI. If the specific RNTI matches the UE's identity and/or stored RNTI, the UE may apply and/or (re-) configure/(re-) initialize the CG configuration indicated by specific message. More specifically, the UE may ignore the specific message if the specific RNTI (e.g., C-RNTI, I-RNTI, P-RNTI, and/or a specific RNTI for small data transmission, etc.) and/or the UE identity (of the specific message) does not match the UE's identity and/or stored RNTI.

The UE may be (pre-) configured with multiple CG configurations. The specific message may be used to indicate which CG configuration(s) may be (re-) configured/(re-) initialized.

More specifically, the specific message may (only) be received when the UE is in RRC_INACTIVE state. More specifically, the monitoring occasion (e.g., CORESET/search space) for monitoring the specific message may be the same as paging.

The CG configuration configured for the UE in RRC_INACTIVE state may only be used for transmission when the UE is in RRC_INACTIVE state. In other words, the UE may not use the CG confirmation configured for RRC_INACTIVE state when the UE is in RRC_CONNECTED state.

Release/Suspension/Deactivation of CG Configuration for RRC_ACTIVE State

The CG configuration/resource configured for the UE in RRC_INACTIVE state may be deactivated, suspended, released, or cleared for a UE in some situations (e.g., when the CG configuration will not be used or the CG configuration is considered as invalid). If the CG configuration/resource is deactivated, suspended, released, and/or cleared, the UE may not perform the (UL) transmission via the CG resource.

In some implementations, one or more of the following alternatives may be applied by the UE to determine whether the UE can perform the (UL) transmission via the CG resource.

In some implementations, one or more of the following alternatives may be applied by the UE to determine whether the CG configuration/resource should be deactivated, suspended, released, and/or cleared.

Alt. A: a timer may be used to control the release/suspension of the CG configuration.

In some implementations, when a CG configuration for RRC_INACTIVE state is configured and/or initialized (e.g., when the UE receives the RRC release message which includes the CG configuration) the UE may (re-) start a timer. When the timer expires, the UE may release/suspend the CG configuration. When the timer is running, the UE may consider the CG valid (e.g., the UE can perform the (UL) transmission via the CG resource).

A timer may be associated with more than one CG configuration. For example, the UE may only maintain one timer. When the timer expires, the UE may release/suspend all the (configured and/or initiated) CG configurations.

A timer may be associated with a CG configuration. For example, the UE may maintain a first timer for a first CG configuration and maintain a second timer for a second CG configuration. When the first timer expires, the UE may only release/suspend the first CG configuration (and not release/suspend the second CG configuration). When the second timer expires, the UE may only release/suspend the second CG configuration (and not release/suspend the first CG configuration.

The timer may be (re-) started when the UE (successfully) transmits (DL and/or UL) data via the UL resource (e.g., CG resource), specifically while the UE is in RRC_INACTIVE state. Preferably, if UL transmission (e.g., via the CG resource) fails to transmit for a period, the UE may release/suspend the CG configuration.

The timer may be (re-) started when the UE receives an indication from the NW, where the indication may be a response for an UL transmission via the CG resource. The response may be a NACK/ACK message which indicates (un) successful reception of the UL transmission via the CG resource.

The timer may be (re-) started when the UE receives an indication from the NW, where the indication may be used to (re-) configure/(re-) initialize the CG configuration.

The timer may be (re-) started when the UE receives an indication from the NW, where the indication may be used to update TA.

The timer may be (re-) started when the UE receives an UL grant which schedules a resource for retransmission while the UE is in RRC_INACTIVE state. The UE may receive the UL grant on PDCCH with a specific RNTI (e.g., C-RNTI, I-RNTI, P-RNTI, and/or a specific RNTI for small data transmission, etc.) provided from the NW. The specific RNTI may be configured in the CG configuration.

The timer may be stopped when the UE initiates an RA procedure. The timer may be stopped when the UE initiates a RRC connection resume procedure.

The timer may be stopped when the UE enters RRC connected state or RRC idle state.

The timer may be stopped when an indication is received from the NW to release/suspend the CG configuration.

The timer may be stopped when the UE receives an RRC message (e.g., RRC setup, RRC resume, RRC reconfiguration, RRC reconfiguration with sync, RRC release, RRC release with an IE suspendConfig, RRC Reestablishment, RRC Reject, MobilityFromNRCommand, and/or, etc.).

The timer may be stopped when the CG configuration that the UE is using in RRC_INACTIVE state has been reconfigured by the NW. The timer may be configured via RRC release message (with an IE suspendConfig) or via a specific configuration for small data transmission included in RRC release message.

Alt. B: an indication (e.g., RRC message) from the NW used to release/suspend the CG configuration, where the indication, for example, may be used to indicate whether the UE may release/suspend the CG configuration (e.g., based on a field included in the indication).

In some implementations, the CG configuration may be released/suspended via paging message (e.g., an RRC message as specified in 3GPP TS 38.331 V15.7.0). More specifically, the paging message may be used for the notification of one or more UEs. The paging message may be transmitted via PCCH. The paging message may include paging record (e.g., UE identity, access type).

When the UE receives the paging message from the NW, the UE may release/suspend the CG configuration if the paging message indicates to the UE to release/suspend the CG configuration. More specifically, upon the UE receiving the paging message, the UE may check if the ue-Identity included in the PagingRecord matches the UE's identity and/or stored fullI-RNTI. The UE may only apply the indication from the paging message if the ue-Identity included in the PagingRecord matches the UE's identity and/or stored fullI-RNTI.

More specifically, a specific indicator may be transmitted via the paging message, where the specific indicator may be used to indicate the purpose of the paging. For example, the specific indicator may be used to indicate whether the UE may release/suspend the CG configuration and/or may initiate the RRC connection resumption procedure.

In some implementations, a legacy UE (e.g., a Rel-15 UE) may ignore the indication for indicating release/suspend a CG configuration. In some implementations, an advanced UE (e.g., a Rel-16 UE) may determine the presence of the indication for releasing/suspending a CG configuration. If the UE determines that the indication is present and if the associated UE ID is present in the PagingRecord, the UE may release/suspend the CG configuration and may not initiate the RRC connection resume procedure. If the UE determines that the indication is absent and if the associated UE ID is present in the PagingRecord, the UE may initiate the RRC connection resume procedure and may not release/suspend the CG configuration.

In some implementations, there may be a UE record for paging (e.g., a PagingRecord) and a UE record for releasing/suspending a CG configuration in a paging message. A legacy UE (e.g., a Rel-15 UE) may ignore the UE record for releasing/suspending a CG configuration in the paging message. An advanced UE (e.g., a Rel-16 UE) may determine the presence of the UE record for releasing/suspending a CG configuration. If the UE determines that the associated UE ID is present in the UE record for releasing/suspending a CG configuration, the UE may release/suspend/deactivate the CG configuration and may not initiate the connection resumption. If the UE determines that the associated UE ID is present in the UE record for paging, the UE may initiate the connection resumption and may not (re-) configure/(re-) initialize/activate the CG configuration. In some implementations, same UE ID may not be present in both of the UE records.

More specifically, if the specific indicator is provided via the paging message, the UE may (re-) configure/(re-) initialize the CG configuration. In addition, if the specific indicator is not provided via the paging message, the UE may initiate the RRC connection resume procedure.

More specifically, the specific indicator may be included in the paging record list. For example, the specific indicator may be a specific paging record.

In some implementations, the paging message may indicate which CG configuration may be released/suspended (e.g., via an index which may be associated with CG configuration(s) (index)). For example, a UE may be configured with a first CG configuration and a second CG configuration. If the UE receives the paging message which indicates the UE to release/suspend the first CG configuration, the UE may release/suspend the first CG configuration (and may not release/suspend the second CG configuration). If the UE receives the paging message which indicates the UE to release/suspend the second CG configuration, the UE may release/suspend the second CG configuration (and may not release/suspend the first CG configuration). If the UE receives the paging message which indicates the UE to release/suspend all the CG configurations, the UE may release/suspend the first and the second CG configurations.

In some implementations, the CG configuration may be released/suspended via short message (e.g., via DCI). Short Messages may be transmitted on PDCCH using P-RNTI with or without an associated paging message using Short Message field in DCI format 1_0. For example, one or more of the bits of the short message may be used to release/suspend the CG configuration.

In some implementations, when the UE receives the short message from the NW, the UE may release/suspend the CG configuration if the short message indicates to the UE to release/suspend the CG configuration. More specifically, upon the UE receiving the short message, the UE may or may not check if the short message is transmitted for the UE (e.g., based on a UE identity). The UE may release/suspend the CG configuration indicated by the short message (e.g., if the short message is transmitted for the UE). More specifically, the UE may ignore the short message if the short message is not transmitted for the UE. More specifically, the UE may ignore the short message if the corresponding CG (which is indicated by the short message) has been released/suspended.

In some implementations, the UE may be configured multiple CG configurations. The short message may be used to indicate which CG configuration(s) may be released/suspended.

In some implementations, the CG configuration may be released/suspended by a specific message (e.g., for small data transmission). More specifically, the specific message (e.g., may be a PHY signalling) may be indicated via a DCI format with CRC scrambled by a specific RNTI (e.g., C-RNTI, I-RNTI, P-RNTI, and/or a specific RNTI for small data transmission, etc.)

In some implementations, the specific message may be an RRC message (e.g., RRC release message and/or with suspend command (e.g., IE suspendConfig) and/or with a specific configuration for small data transmission), which may be used to release/suspend the CG configuration(s). More specifically, the specific message may be used to indicate whether the UE should release/suspend the CG configuration (e.g., based on a field included in the specific message).

In some implementations, the UE may or may not check if the specific message is transmitted for the UE (e.g., based on the specific RNTI (e.g., C-RNTI, I-RNTI, P-RNTI, and/or a specific RNTI for small data transmission, etc.) and/or a UE identity). The UE may release/suspend the CG configuration indicated by the specific message (e.g., if the specific message is transmitted for the UE). In some other implementations, the UE may be configured with multiple CG configurations. The specific message may be used to indicate which CG configuration(s) may be released/suspended.

In some implementations, the specific message may be received on the PDCCH and/or on the PDSCH).

In some implementations, upon the UE receiving the specific message, the UE may check if the specific RNTI (e.g., C-RNTI, I-RNTI, P-RNTI, and/or a specific RNTI for small data transmission, etc.) and/or the UE identity (of the specific message) matches the UE's identity and/or stored RNTI. If the specific RNTI matches the UE's identity and/or stored RNTI, the UE may release/suspend the CG configuration indicated by the specific message. More specifically, the UE may ignore the specific message if the specific RNTI (e.g., C-RNTI, I-RNTI, P-RNTI, and/or a specific RNTI for small data transmission, etc.) and/or the UE identity (of the specific message) does not match the UE's identity and/or stored RNTI.

The UE may be configured with multiple CG configurations. The specific message may be used to indicate which CG configuration may be released/suspended.

More specifically, the specific message may (only) be received when the UE is in RRC_INACTIVE state.

More specifically, the monitoring occasion (e.g., CORESET/search space) for monitoring the specific message may be the same as paging.

Alt. C: The UE May Release/Suspend the CG Configuration Based on TA Validity.

In some implementations, a specific timer may be used to control whether the TA is valid. For example, the UE may consider the TA valid if the specific timer is running. The UE may consider the TA invalid if the specific timer expires or the specific timer is not running.

The specific timer may be (re-) started when the UE (successfully) transmits data via the UL resource (e.g., CG resource) while the UE is in RRC_INACTIVE state. The UE may release the CG configuration in the case that the specific timer expires.

The specific timer may be (re-) started when the UE receives an indication from the NW, where the indication may be a response for an UL transmission, e.g., transmitted via the CG resource.

The specific timer may be (re-) started when the UE receives an indication from the NW, where the indication may be used to (re-) configure/(re-) initialize the CG configuration. For example, the indication may be an RRC release message (e.g., also called RRC release) and/or with suspend command (e.g., IE suspendConfig) and/or with a specific configuration for small data transmission.

The specific timer may be (re-) started when the UE receives an indication from the NW, where the indication may be used to update TA. For example, the indication may be a Timing Advance command which is included in RAR, MAC CE, and/or MSGB.

The specific timer may be (re-) started when the UE receives an UL grant which schedules a (UL) resource for (re-) transmission while the UE is in RRC_INACTIVE state. The UE may receive the UL grant on PDCCH with a specific RNTI (e.g., C-RNTI, I-RNTI, P-RNTI, and/or a specific RNTI for small data transmission, etc.) provided from the NW. The special RNTI may be provided in the CG configuration.

The specific timer may be stopped when the UE initiates an RA procedure. More specifically, the timer may be stopped when the UE initiates an RRC connection resume procedure.

The specific timer may be stopped when the UE transitions to RRC_CONNECTED state and/or RRC_IDLE state from RRC_INACTIVE state.

The specific timer may be stopped when an indication is received from the NW to release/suspend the corresponding CG configuration.

The specific timer may be stopped when the UE receives an RRC message (e.g., RRC setup, RRC resume, RRC reconfiguration, RRC reconfiguration with sync, RRC release, RRC release (with an IE suspendConfig), RRC Reestablishment, RRC Reject, MobilityFromNRCommand, and/or, etc.)

The specific timer may be stopped when the CG configuration indicates that the CG configuration has been reconfigured by the NW. More specifically, the UE may release/suspend all the CG configuration(s) (e.g., associated with a BWP, a cell, and/or a TAG) if the corresponding TA is considered invalid (e.g., when the TA timer expires).

More specifically, the UE may release/suspend a CG configuration which is configured for a BWP/cell/TAG if the UE considers the TA associated with the BWP/cell/TAG is invalid (e.g., when the TA timer expires).

TAG may be a group of BWPs/Serving Cells that is configured by RRC and, for the cells with a UL configured, uses the same timing reference cell and the same Timing Advance value. A TAG containing the SpCell of a MAC entity is referred to as Primary TAG (PTAG), whereas the term Secondary TAG (STAG) refers to other TAGs.

More specifically, the specific timer may be configured via an RRC release message (with an IE suspendConfig) or via a specific configuration for small data transmission included in RRC release message. More specifically, the specific timer may be a TA timer.

Alt. D: The UE May Release/Suspend the CG Configuration Based on (DL) Channel Condition.

The UE may perform measurement of DL reference signal(s) to determine whether to release/suspend the CG configuration. If the channel quality is not good enough, the UE may release/suspend the CG configuration. The UE may determine whether to release/suspend the CG configuration based on pathloss (change).

The UE may determine whether to release/suspend the CG configuration based on the measurement of RSRP (e.g., RSRP for a Synchronization Signal block (SSB) and/or RSRP for a CSI-RS). More specifically, the UE may be configured with a threshold. If the measured RSRP (value) for a SSB/CSI-RS is lower than a threshold, the UE may release/suspend the CG configuration associated with the SSB/CSI-RS. Alternatively, if the change/difference of the measured RSRP (on different time) is higher than a threshold, the UE may release/suspend/deactivate the CG configuration.

The UE may determine whether to release/suspend/deactivate the CG configuration based on the measurement of SINR. More specifically, the UE may be configured with a threshold. If the measured SINR is lower or higher than threshold, the UE may release/suspend the CG configuration. Alternatively, if the change/difference of the SINR (measured on different time) is higher or lower than a threshold, the UE may release/suspend the CG configuration.

More specifically, the UE may release/suspend all the (initiated) CG configuration(s) (e.g., associated with a BWP, a cell) if the condition(s) mentioned above is satisfied.

More specifically, the disclosed threshold may be configured via an RRC release message (with an IE suspendConfig) or via a specific configuration for small data transmission included in RRC release message.

Alt. E: If UL Transmission (e.g., Via the CG Resource) Fails a Number of Times, the UE May Release/Suspend the CG Configuration.

The UE may maintain a count of how many times (UL/DL) transmission (via the CG resource) has failed to (e.g., if the UE could not receive the feedback for the transmission from the NW, such as during a time window, the UE may consider the transmission as failed). If a number (or a counter) reaches a specific value (which may be configured by the NW), the UE may release/suspend the CG configuration.

If the UE does not transmit a (UL/DL) transmission (via CG resource) successfully, the number (or the counter) may be incremented (e.g., by one).

If the UE does not receive an ACK for an UL transmission (via CG resource), the number (or the counter) may be incremented (e.g., by one).

If the UE receives a NACK for an UL transmission (via CG resource), the number (or the counter) may be incremented (e.g., by one).

If the UE does not transmit an UL transmission (via CG resource), such as due to no data arrival, the UE may or may not increment the number (or the counter).

If the UE skips an UL transmission (via CG resource), e.g., due to no data arrival, the UE may or may not increment the number (or the counter).

The number and/or the counter may be reset if the UE transmits a (UL/DL) transmission (via CG resource) successfully (e.g., if the UE could receive feedback (e.g., ACK) for the transmission from the NW, such as during a time window, the UE may consider the transmission successful).

More specifically, the number and/or the counter may be reset when the UE receives an indication from the NW, where the indication may be a response/feedback/ACK for an UL transmission (via the CG resource).

More specifically, the number and/or the counter may be reset when the UE receives an indication from the NW, where the indication may be used to (re-) configure/(re-) initialize the corresponding CG. For example, the indication may be a RRC release message (e.g., also called RRC release) and/or a suspend command (e.g., IE suspendConfig) and/or a specific configuration for small data transmission.

More specifically, the number and/or the counter may be reset when the UE receives an indication from the NW, where the indication may be used to update TA. For example, the indication may be a Timing Advance command which is included in an RAR, a MAC CE, and/or a MSGB.

More specifically, the number and/or the counter may be associated with one or more of the CG configuration(s).

More specifically, the number and/or the counter may be reset when the UE receives an UL grant which schedules a resource for (re-) transmission while the UE is in RRC_INACTIVE state. The UE may receive the UL grant on a PDCCH with a specific RNTI (e.g., C-RNTI, I-RNTI, P-RNTI, and/or a specific RNTI for small data transmission, etc.) provided from the NW. The specific RNTI may be provided in the CG configuration.

More specifically, the number and/or the counter may be reset when the UE initiates an RA procedure. More specifically, the number and/or the counter may be reset when the UE initiates a RRC connection resume procedure.

More specifically, the number and/or the counter may be reset when the UE transitions to RRC_CONNECTED state and/or RRC_IDLE state from RRC_INACTIVE state.

More specifically, the number and/or the counter may be reset when an indication is received from the NW to release/suspend the CG configuration.

More specifically, the number and/or the counter may be reset when the CG configuration indicating that the UE is in RRC_INACTIVE state has been reconfigured by the NW.

More specifically, the number and/or the counter may be reset when the UE receives an RRC message (e.g., RRC setup, RRC resume, RRC reconfiguration, RRC reconfiguration with sync, RRC release, RRC release (with an IE suspendConfig), RRC Reestablishment, RRC Reject, MobilityFromNRCommand, and/or, etc.).

More specifically, the number and/or the counter may be configured via an RRC release message (with an IE suspendConfig) or via a specific configuration for small data transmission included in the RRC release message.

A first counter may be associated with a first CG configuration, and a second counter may be associated with a second CG configuration. The UE may only increment the first counter if the above condition(s) associated with the first CG configuration is satisfied. If the first counter reaches a specific value, the UE may release/suspend the first CG configuration.

Alt. F: If the UE Leaves the Original Cell which Provides/Configures a CG Configuration, the UE May Release/Suspend the CG Configuration, and the UE May (Re) Initialize CG Configuration when the UE Camps on a New Cell.

A UE may be configured with a first CG configuration(s) on/by a first cell. If the UE leaves or moves out of the first cell and/or to enter/camp on a second cell, the UE may release/suspend the first CG configuration.

More specifically, the UE may (re) initialize the first CG configuration and/or another CG configuration when the UE successfully enters/camps on a second cell.

More specifically, the UE may store the first CG configuration(s) even if the UE leaves or moves out from the first cell.

Alt. G: The UE May Release/Suspend the CG Configuration when RRC State of the UE Transitions from RRC_INAC- TIVE State, and the UE May Transition from the RRC_I-NACTIVE State to RRC_CONNECTED State or RRC_IDLE State.

When the UE transitions from RRC_INACTIVE state to RRC_IDLE state, the UE may release/suspend the CG configuration (e.g., if the CG is configured for RRC_INACTIVE state and/or for small data transmission). If the UE receives an RRC release message from the NW, the UE may transition to an RRC_IDLE state from the RRC_INACTIVE state, and the UE may release/suspend the CG configuration (e.g., if the CG configuration is configured for the RRC_INACTIVE state and/or for small data transmission).

More specifically, the UE may (re-) initialize the CG configuration when the UE enters RRC_CONNECTED state (e.g., from RRC_IDLE state and/or from RRC_INACTIVE state) (e.g., if the CG configuration has not been released.) When a timer, e.g., T301, T311 as introduced in 3GPP TS 38.331 V15.7.0, expires, the UE may enter RRC_IDLE state, and the UE may release/suspend the CG configuration (e.g., if the CG configuration is configured for RRC_INACTIVE state and/or for small data transmission).

Upon the UE receiving the (CN and/or RAN) paging message, the UE may determine whether the UE identity included in the paging record matches the UE identity allocated by upper layers. If the UE identity included in the paging record matches the UE identity allocated by upper layers, the UE may forward the UE identity to the upper layers and/or access type to the upper layers. The UE may enter RRC_IDLE state, and the UE may release/suspend the CG configuration (e.g., if the CG configuration is configured for RRC_INACTIVE state and/or for small data transmission).

When the UE transitions from RRC_INACTIVE state to RRC_CONNECTED state, the UE may release/suspend/deactivate the CG configuration (e.g., the CG is configured for RRC_INACTIVE state).

If the UE receives an RRC resume message from the NW, the UE may enter RRC_CONNECTED state, and the UE may release/suspend the CG configuration (e.g., if the CG configuration is configured for RRC_INACTIVE state and/or for small data transmission). If the UE receives an RRC setup message from the NW, the UE may enter RRC_CONNECTED state (e.g., if the RRCSetup is received in response to an RRCResumeRequest, RRCResumeRequest1 or RRCSetupRequest), and the UE may release/suspend the CG configuration (e.g., if the CG is configured for RRC_INACTIVE state and/or for small data transmission). If the UE receives an RRC setup message from the NW, the UE may enter RRC_CONNECTED state, and the UE may release/suspend the CG configuration (e.g., if the CG is configured for RRC_INACTIVE state and/or for small data transmission).

The UE may release/suspend the CG configuration (e.g., if the CG is configured for RRC_INACTIVE state and/or for small data transmission) upon initiating a RRC Connection Resume procedure.

The UE may release/suspend the CG configuration (e.g., if the CG is configured for RRC_INACTIVE state and/or for small data transmission) upon moving outside and/or update the configured RNA, e.g., if T380, as introduced in 3GPP TS 38.331 V15.7.0, expires and/or if an RNA update is triggered upon reception of SIB1.

More specifically, suspending the CG configuration may refer to the UE storing the CG and not releasing the CG. The suspended CG configuration may be re-initialized based on conditions.

More specifically, releasing the CG configuration may refer to releasing/clearing the UL resource and/or the CG configuration. The released CG configuration may or may not be allowed to be re-initialized.

More specifically, the CG configuration may be (re-) configured by RRC signaling (e.g., an RRC release message and/or suspend command (e.g., IE suspendConfig) and/or with a specific configuration for small data transmission).

Figure 2:
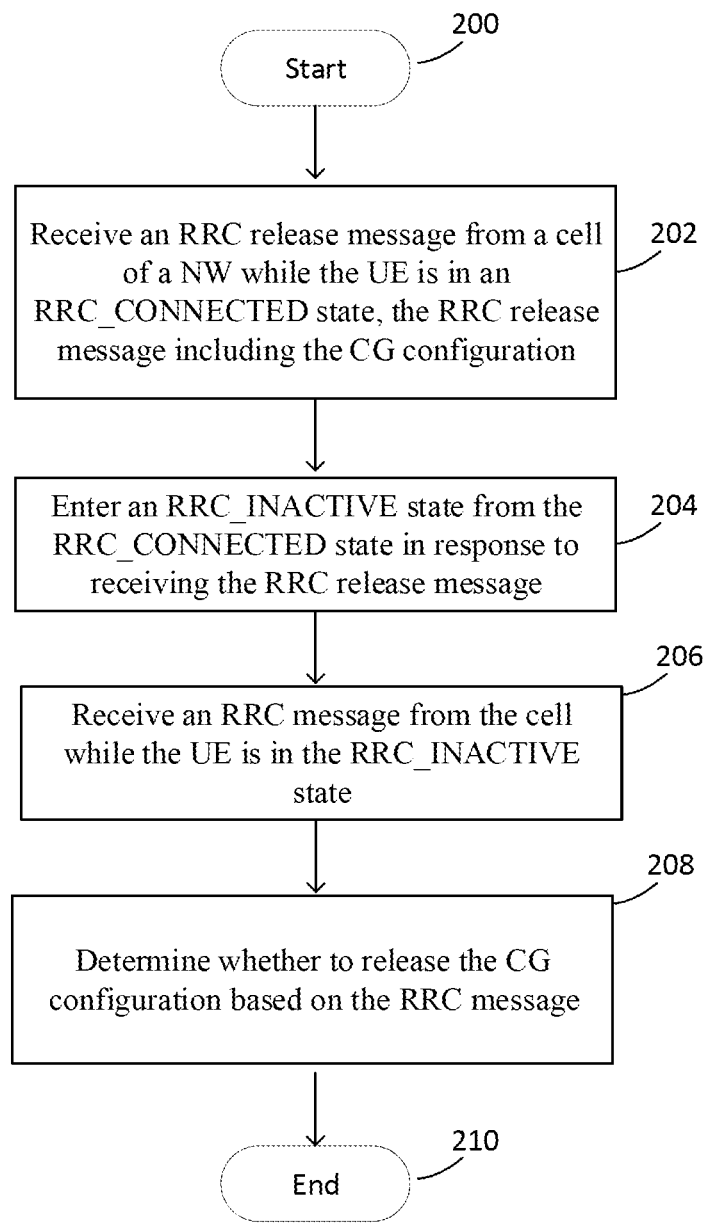
FIG. 2 illustrates a procedure for CG configuration performed by a UE, according an example implementation of the present disclosure.

Please refer to FIG. 2, which illustrates a procedure 20 for CG configuration performed by a UE according to an implementation of the present disclosure. As illustrated in FIG. 2, the procedure 20 for the UE includes the following actions:

Action 200: Start.
Action 202: Receive an RRC release message from a cell of a NW while the UE is in an RRC_CONNECTED state, wherein the RRC release message includes the CG configuration.
Action 204: Enter an RRC_INACTIVE state from the RRC_CONNECTED state in response to receiving the RRC release message.
Action 206: Receive an RRC message from the cell while the UE is in the RRC_INACTIVE state.
Action 208: Determine whether to release the CG configuration based on the RRC message.
Action 210: End.

Preferably, action 202 to action 208 of the procedure 20 may be performed by the UE. Specifically, the CG configuration may be used for small data transmission. Specifically, release the CG configuration may be referred to as the UE releases and/or clears the CG resource.

The UE may receive the RRC release message from the cell of the NW while the UE is in the RRC_CONNECTED state in action 202, where the RRC release message may include the CG configuration, an IE suspendConfig, a configuration for a TA timer (e.g., an IE for the TA timer), and/or a configuration for small data transmission. In action 204, the UE may transition to RRC_INACTIVE state from RRC_CONNECTED state in response to the RRC release message. In action 206, the UE may receive the RRC message from the cell while the UE is in RRC_INACTIVE state. In action 208, the UE may determine whether to release the CG configuration based on the RRC message. Specifically, the RRC message may be an RRC release message. Specifically, the RRC message may indicate whether the UE needs to release the CG configuration.

Certainly, the detailed mechanisms and/or operations for the procedure 20 are described in above paragraphs and neglected hereinafter for brevity. Certainly, the detailed mechanisms and/or operations for action 202 to action 208 are described in above paragraphs and neglected hereinafter for brevity.

The procedure 20 may further include further actions/procedures/mechanisms/operations. Specifically, the UE may store the CG configuration in response to the RRC release message. Specifically, the UE may discard the stored CG configuration in a case that the UE releases the CG configuration. Specifically, the UE may clear the CG resource in a case that the UE releases the CG configuration.

The UE may (re) start a TA timer in response to the RRC release message. The UE may release the CG configuration in a case that the TA timer expires while the UE is in RRC_INACTIVE state, where the TA timer may be configured in the RRC release message. The UE may (re) start the TA timer in a case that the UE receives a Timing Advance command while the UE is in RRC_INACTIVE state. The UE may release the CG configuration in a case that the TA timer expires while the UE is in RRC_INACTIVE state, where the Timing Advance command may be included in one of an RAR, a MAC CE (e.g., a Timing Advance Command MAC CE) and a MSGB.

The Timing Advance command may be used to update the TA. While the TA timer is running, the UE may consider the TA valid (i.e., the UL is time aligned). If the TA timer expires and/or is not running, the UE may consider the TA not valid.

The UE may be configured to determine whether to release the CG configuration based on a measurement of an RSRP. For example, the UE may release the CG configuration in a case that the RSRP for an SSB is lower than a threshold; alternatively, the UE may release the CG configuration in a case that the change/difference of the RSRP (measured on different time) is higher than a threshold. Specifically, the change/difference of the RSRP (measured on different time) is higher than a threshold refer to the RSRP has increased by more than the threshold. Alternatively, the change/difference of the RSRP (measured on different time) is higher than a threshold may refer to the RSRP has decreased by more than the threshold.

The UE may release the CG configuration in a case that the UE leaves the cell (e.g., a first cell) to another cell (e.g., a second cell). Specifically, the first cell may be a cell which provides/configures the CG configuration.

The UE may (re) start a specific timer upon transmitting data while the UE is in RRC_INACTIVE state. The UE may release the CG configuration in a case that the specific timer expires.

Figure 3:
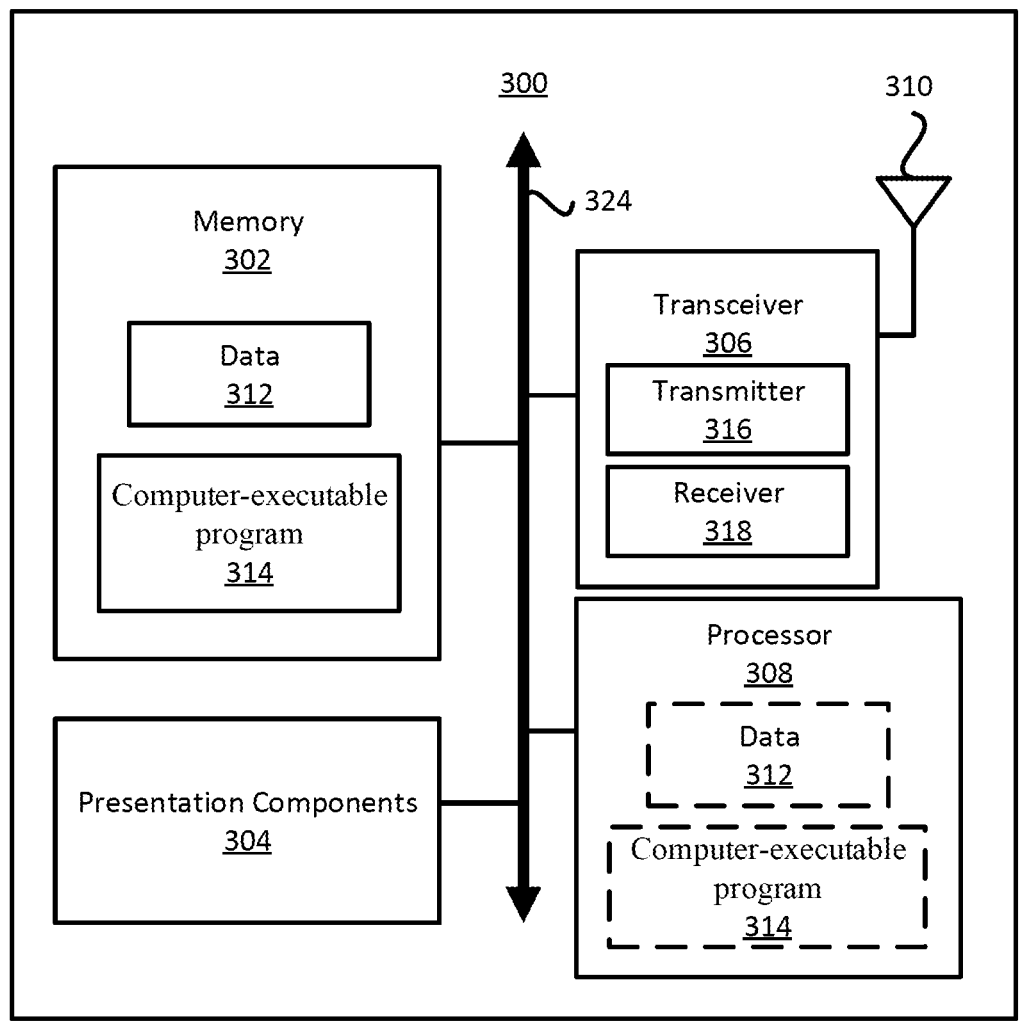
FIG. 3 illustrates a block diagram of a node for wireless communication, according to an example implementation of the present disclosure.

Please refer to FIG. 3, which illustrates a block diagram of a node 300 for wireless communication according to. As illustrated in FIG. 3, the node 300 includes a transceiver 306, a processor 308, a memory 302, one or more presentation components 304, and at least one antenna 310. The node 300 may also include a Radio Frequency (RF) spectrum band module, a BS communications module, an NW communications module, and a system communications management module, input/output (I/O) ports, I/O components, and power supply (not explicitly illustrated in FIG. 3). Each of these components may be in communication with each other, directly or indirectly, over one or more buses 324. The node 300 may be a UE or a BS that performs various functions disclosed herein, for example, with reference to FIG. 2.

The transceiver 306 includes a transmitter 316 (e.g., transmitting/transmission circuitry) and a receiver 318 (e.g., receiving/reception circuitry) and may be configured to transmit and/or receive time and/or frequency resource partitioning information. The transceiver 306 may be configured to transmit in different types of subframes and slots, including, but not limited to, usable, non-usable and flexibly usable subframes and slot formats. The transceiver 306 may be configured to receive data and control channels.

The node 300 may include a variety of computer-readable media. Computer-readable media may be any available media that may be accessed by the node 300 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable. Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media.

The term "modulated data signal" may refer to a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the previous disclosure should also be included within the scope of computer-readable media.

The memory 302 may include computer-storage media in the form of volatile and/or non-volatile memory. The memory 302 may be removable, non-removable, or a combination thereof. For example, the memory 302 may include solid-state memory, hard drives, optical-disc drives, etc.

As illustrated in FIG. 3, the memory 302 may store a computer-executable (or readable) program 314 (e.g., software codes) that are configured to, when executed, cause the processor 308 to perform various functions disclosed herein, for example, with reference to FIG. 2. Alternatively, the computer-executable program 314 may not be directly executable by the processor 308 but may be configured to cause the node 300 (e.g., when compiled and executed) to perform various functions disclosed herein.

The processor 308 (e.g., having processing circuitry) may include an intelligent hardware device, a Central Processing Unit (CPU), a microcontroller, an ASIC, etc. The processor 308 may include memory. The processor 308 may process the data 312 and the computer-executable program 314 received from the memory 302, and information received via the transceiver 306, the baseband communications module, and/or the NW communications module. The processor 308 may also process information to be sent to the transceiver 306 for transmission through the antenna 310 to the NW communications module for subsequent transmission to a CN.

One or more presentation components 304 may present data to a person or other device. Examples of presentation components 304 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for configuring a Configured Grant (CG), the method comprising:

receiving a Radio Resource Control (RRC) release message that includes a suspend configuration from a cell of a Network (NW), the suspend configuration including a Small Data Transmission (SDT) configuration that includes a CG configuration, the CG configuration including a bandwidth part indication and a threshold value for a change of a Reference Signal Receiving Power (RSRP);

entering an RRC_INACTIVE state in response to receiving the RRC release message; and suspending the CG configuration associated with a bandwidth part indicated by the bandwidth part indication in a case that a difference between a first RSRP measured at a first time and a second RSRP measured at a second time is higher than the threshold value, wherein both the first RSRP and the second RSRP are derived based on measurements of a Synchronization Signal Block (SSB).

2. The method of claim 1, further comprising:
storing the CG configuration in response to receiving the RRC release message.

3. The method of claim 1, further comprising:
clearing a CG resource configured by the CG configuration if a Timing Alignment (TA) timer expires while the UE is in the RRC_INACTIVE state.

4. The method of claim 3, further comprising:
starting or restarting the TA timer in response to receiving the RRC release message, wherein the TA timer is configured based on the suspend configuration in the RRC release message.

5. The method of claim 3, further comprising:
starting or restarting the TA timer if the UE receives a Timing Advance command while the UE is in the RRC_INACTIVE state, the Timing Advance command being included in one of a Random Access Response (RAR), a Medium Access Control (MAC) Control Element (CE), or a Message B (MSGB).

6. The method of claim 1, wherein the cell is a Primary Cell (PCell).

7. The method of claim 1, wherein the first RSRP measured at the first time is stored by the UE.

8. A User Equipment (UE) in a wireless communication system for configuring a Configured Grant (CG), the UE comprising:
at least one processor; and
at least one non-transitory computer-readable medium coupled to the at least one processor, and storing one or more computer-executable instructions that, when executed by the at least one processor, cause the UE to:
receive a Radio Resource Control (RRC) release message that includes a suspend configuration from a cell of a Network (NW), the suspend configuration including a Small Data Transmission (SDT) configuration that includes a CG configuration, the CG configuration including a bandwidth part indication and a threshold value for a change of a Reference Signal Receiving Power (RSRP);

enter an RRC_INACTIVE state in response to receiving the RRC release message; and suspend the CG configuration associated with a bandwidth part indicated by the bandwidth part indication in a case that a difference between a first RSRP measured at a first time and a second RSRP measured at a second time is higher than the threshold value, wherein both the first RSRP and the second RSRP are derived based on measurements of a Synchronization Signal Block (SSB).

9. The UE of claim 8, wherein the one or more computer-executable instructions, when executed by the at least one processor, further cause the UE to:
store the CG configuration in response to receiving the RRC release message.

10. The UE of claim 8, wherein the one or more computer-executable instructions, when executed by the at least one processor, further cause the UE to:
clear a CG resource configured by the CG configuration if a Timing Alignment (TA) timer expires while the UE is in the RRC_INACTIVE state.

11. The UE of claim 10, wherein the one or more computer-executable instructions, when executed by the at least one processor, further cause the UE to:
start or restart the TA timer in response to receiving the RRC release message, wherein the TA timer is configured based on the suspend configuration in the RRC release message.

12. The UE of claim 10, wherein the one or more computer-executable instructions, when executed by the at least one processor, further cause the UE to:
start or restart the TA timer if the UE receives a Timing Advance command while the UE is in the RRC_INACTIVE state, the Timing Advance command being included in one of a Random Access Response (RAR), a Medium Access Control (MAC) Control Element (CE), or a Message B (MSGB).

13. The UE of claim 8, wherein the cell is a Primary Cell (PCell).

14. The UE of claim 8, wherein the first RSRP measured at the first time is stored by the UE.

* * * * *